United States Patent [19]
Liu Sheng et al.

[11] Patent Number: 5,615,112
[45] Date of Patent: Mar. 25, 1997

[54] SYNTHESIZED OBJECT-ORIENTED ENTITY-RELATIONSHIP (SOOER) MODEL FOR COUPLED KNOWLEDGE-BASE/DATABASE OF IMAGE RETRIEVAL EXPERT SYSTEM (IRES)

[75] Inventors: Olivia R. Liu Sheng; Chih-Ping Wei, both of Tucson; Takeshi Ozeki, Foster City, all of Ariz.

[73] Assignees: Arizona Board of Regents, Tucson, Ariz.; Toshiba Corporation, Tokyo, Japan

[21] Appl. No.: 11,504

[22] Filed: Jan. 29, 1993

[51] Int. Cl.$^6$ .................................................. G06F 15/00
[52] U.S. Cl. .............. 395/615; 395/10; 395/12; 395/52; 395/76; 395/614; 395/50
[58] Field of Search .................. 395/51, 54, 600, 395/10, 50, 55, 60; 364/419.01, 413.02

[56] References Cited

U.S. PATENT DOCUMENTS

| | | | |
|---|---|---|---|
| 4,884,218 | 11/1989 | Agnew et al. | 395/54 |
| 4,912,648 | 3/1990 | Tyler | 395/61 |
| 4,930,071 | 5/1990 | Tou et al. | 395/600 |
| 4,935,876 | 7/1990 | Hanatsuka | 395/51 |
| 4,972,328 | 11/1990 | Wu et al. | 395/75 |
| 5,041,992 | 8/1991 | Cunningham et al. | 395/135 |
| 5,075,848 | 12/1991 | Lai et al. | 395/479 |
| 5,093,914 | 3/1992 | Coplien et al. | 395/700 |
| 5,263,126 | 11/1993 | Chang | 395/51 |
| 5,317,508 | 3/1994 | Okamoto et al. | 364/419.01 |
| 5,355,445 | 10/1994 | Shibao et al. | 395/54 |
| 5,418,943 | 5/1995 | Borgida et al. | 395/600 |
| 5,418,944 | 5/1995 | DiPace et al. | 395/600 |

OTHER PUBLICATIONS

"Artificial intelligent can reduce cost by optimizing design decisions Part III"; Industrial Engineering, v23, n8, p42(5) John Izuchukwu; Aug., 1991.

"ONCOCIN Medical Expert System", Tu et al., Communications of the ACM, v32, n12, p1439(17) Dec. 1989.

"An Object–Oriented Methodology for Knowledge base/database Coupling", Higa et al., Communications of the ACM, v35, n6, p99(15) Jun. 1992.

Kunihiko Higa, and Olivia R. Liu Sheng, "End–User Database Design: The Structured Object Model," Working Paper, University of Arizona, 1990, pp. 1–27.

Olivia R. Liu Sheng and Hong–Mei Chen Garcia, "The Design of Medical Image Database: A Distributed Approach," Proceedings of IPCCC, Mar. 1990, pp. 288–295.

(List continued on next page.)

Primary Examiner—Thomas G. Black
Assistant Examiner—Hosain T. Alam
Attorney, Agent, or Firm—Oblon, Spivak, McClelland, Maier & Neustadt, P.C.

[57] ABSTRACT

A method and system for retrieving images using a coupled knowledge-base/database is provided, the method comprising the steps of modeling structural knowledge by identifying classes and attributes of classes, determining relationships among the classes, operations for each classes; modeling heuristic and general procedural knowledge by acquiring heuristic rules for each class dependent on the application domain, specifying data processing procedures required by the heuristic rules acquired; modeling control knowledge by specifying intra-class-hierarchy searching paths, specifying intra-class-hierarchy searching paths, and representing the specified search paths in triggers for each class; and deriving a schema for the coupled database from the structural knowledge. The knowledge-based system for retrieving images provided includes a coupled knowledge-base/database and comprises a knowledge-base storing expert knowledge information including structural knowledge, general procedural knowledge, heuristic knowledge, and control knowledge; a database storing patient information; a knowledge-base/database interface for coupling the database to the knowledge-base; reasoning means to search the classes for the selecting rules; retrieving means for retrieving the examination data; and a user interface; and a control interface for coupling the user interface to the knowledge-base.

35 Claims, 21 Drawing Sheets

OTHER PUBLICATIONS

Olivia R. Liu Sheng, Hong–Mei Chen Garcia, Chih–Ping Wei, Takeshi Ozeki, Patricia McNulty, "Distributed Database Design and Modeling for PACS," 1990, pp. 256–269.

Olivia R. Liu Sheng, Ralph Martinez, Jhyfang Hu, and Yuehmin Huang, "DIAES — A Distributed Image Archiving Expert System," Proceedings of IPCCC, Mar. 1990, pp. 749–756.

Olivia R. Liu Sheng, Huichin Wang, and Hong–Mei Chen Garcia, "IRES — Image Retrieval Expert System," 1990, pp. 832–841.

Joan Peckham and Fred Maryanski, "Semantic Data Models," ACM Computing Surveys, vol. 20, No. 3, Sep. 1988, pp. 153–189.

Richard Hull, and Roger King, "Semantic Database Modeling: Survey Applications, and Research Issues," ACM Computing Surveys, vol., 19, No. 3, Sep. 1987, pp. 201–260.

Kevin Gorman, and Joobin Choobineh, "An Overview of the Object–Oriented Entity–Relationship Model (OOERM)," 1990, pp. 336–345.

Peter Pin–Shan Chen, "The Entity–Relationship Model — Toward a Unified View of Data," ACM Transactions in Database Systems, vol. 1, No. 1, Mar. 1976, pp. 9–36.

Michael R. Blaha, William J. Premerlani and James E. Rumbaugh, "Relational Database Design Using An Object–Oriented Methodology," Communications of ACM, vol. 31, No. 4, Apr. 1988, pp. 414–427.

M. E. S. Loomis, A. V. Shah, and J. E. Rumbaugh, "An Object Modeling Technique for Conceptual Design," Lecture Notes, Jun. 1987, pp. 192–202.

Joline Morrison, Mike Morrison, Olivia R. Liu Sheng, "A Hierarchical, Object–Oriented Knowledge Base Architecture for Coupled Knowledge Base/Database Systems," University of Arizona, Working Paper Series, 1990, pp. 1–30.

Kunihiko Higa, Mike Morrison, Joline Morrison, and Olivia R. Liu Sheng, "An Object–Oriented Methodology for Knowledge Base/Database Coupling," Working Paper, University of Arizona, 1990, 36 pages.

Huichin Wang, Olivia R. Liu Sheng, and Hong–Mei Chen Garcia, and Theron W. Ovitt, "Image Retrieval Expert System," (date unknown) pp. 198–205.

| ENTITY | PROPERTIES |
|---|---|
| PATIENT | PATIENT ID # |
| | NAME |
| | ADDRESS |
| | DATE OF BIRTH |
| | SEX |
| EXAMINATION | EXAM ID # |
| | COMPLETION DATE |
| | PROCEDURE CODE |
| | REASON |
| | DIAGNOSIS |
| IMAGE | IMAGE ID # |
| | DATE |
| | TIME |

*FIG. 3*

| SELECT | NAME |
|---|---|
| FROM | ENTITY OF PATIENT |
| WHERE | PATIENT ID # = '12345678' |
| | |
| SELECT | EXAM ID # |
| FROM | PATIENT-EXAM RELATIONSHIP |
| WHERE | PATIENT ID # = '12345678' |
| ORDER BY | COMPLETION DATE |

*FIG. 4*

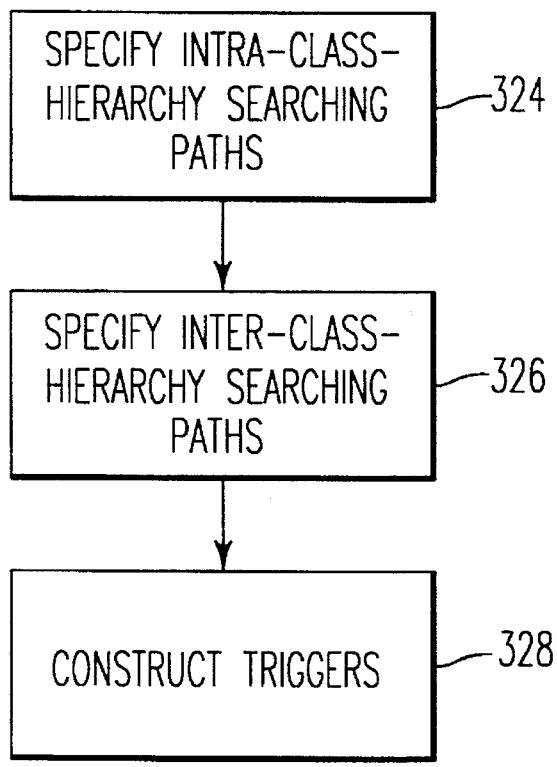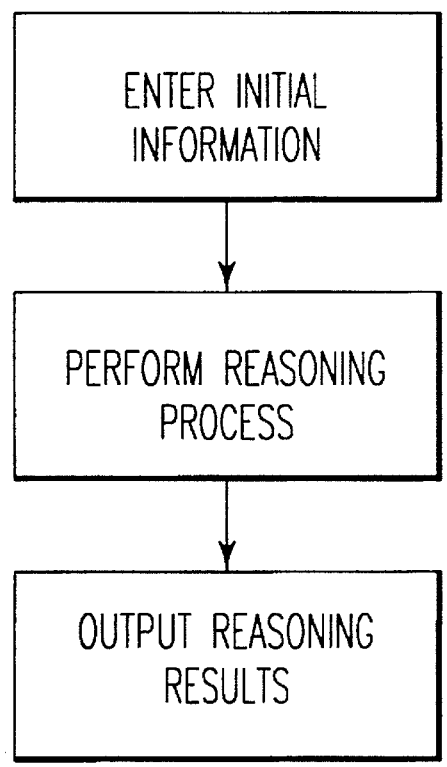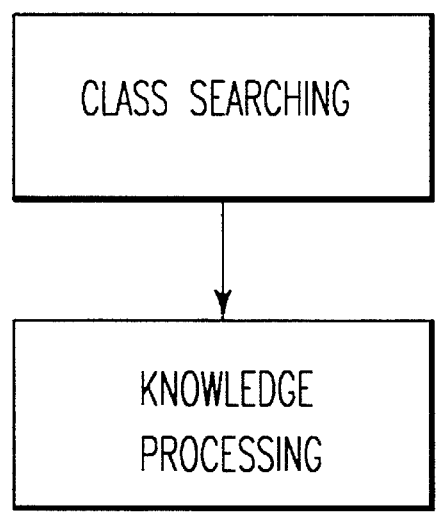

PATIENT TABLE
   PATIENT-ID#: INTEGER
   NAME: STRING
   ADDRESS: STRING
   DATE-OF-BIRTH: DATE
   SEX: CHARACTER
   SOURCE: STRING
   IDENTIFIER: PATIENT-ID#

EXAMINATION TABLE
   EXAM-ID#: INTEGER
   COMPLETION-DATE: DATE
   PROCEDURAL-CODE: INTEGER
   REASON: STRING
   TYPE: STRING
   PATIENT-ID#: STRING
   MODALITY-TYPE: STRING
   APORTION-NAME: STRING
   IDENTIFIER: EXAM-ID#
   FOREIGN KEY: PATIENT-ID# IN PATIENT TABLE
   FOREIGN KEY: MODALITY-TYPE IN MODALITY TABLE
   FOREIGN KEY: APORTION NAME IN
                        ANATOMICAL-PORTION TABLE

*FIG. 21*

SYNTHESIZED OBJECT-ORIENTED ENTITY-RELATIONSHIP (SOOER) MODEL FOR COUPLED KNOWLEDGE-BASE/DATABASE OF IMAGE RETRIEVAL EXPERT SYSTEM (IRES)

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method for designing a coupled knowledge-base/database using a synthesized object-oriented entity-relationship model and, more particularly to a knowledge-based system and method for the retrieval of images using a coupled knowledge-base/database designed using a synthesized object-oriented entity-relationship model.

2. Discussion of the Background

Over the past two decades, databases have evolved into the central component of organizational information systems. A great many information systems are operated in environments requiring that a large amount of information or data be managed and processed. Further, the users of such systems often require high performance operation in information retrieval and processing functions.

Database and knowledge-base technologies have been widely employed by organizations to meet their information needs. Knowledge processing is widely accepted in business, industry, and engineering as valuable for handling information and has made possible advances in the capabilities of data processing and information systems.

Typically, a database maintains well-structured data representing the facts that traditionally are essential to data sharing and processing activities, while a knowledge-base contains less precise, more abstract, and possible subjective knowledge used mainly for decision and planning support. Because data come in larger quantities and are more dynamic than knowledge, database technologies are most often concerned with efficient update and retrieval operations on large sets of data whereas knowledge-base technologies address small-size knowledge-base processing and infrequent knowledge-base maintenance. Knowledge-based technologies have been applied to database systems to enhance data retrieval functions by providing decision and planning support.

One such effort to provide knowledge-based capabilities in a large, complex information system has been made in the area of image retrieval, and more particularly in a system for the retrieval of radiographic images for use in a hospital environment.

Advances in computer, communication and digital radiographic imaging technologies have encouraged many organizations to launch efforts to realize totally digitized radiology services. Extensive research and development is taking place in the areas of picture archiving and communication systems (PACS) that handle the creation, storage, retrieval, transmission and display of digital patient radiographic images and pertinent information for radiology-related services.

One of the core components of a PACS is a database system that stores and manages images and pertinent textual data. Massive amounts of data are generated every day (e.g., 3.8 gigabits in a 500 bed hospital) as new images in digital form are stored. In operation, the digitized images are retrieved from the PACS database for use by radiologists at viewing workstations. In order to meet the performance requirements of radiologists, a response time of less than two seconds is required. In an effort to satisfactorily handle the large amount of information and meet the performance goals required, some designs for PACS database systems have adopted a multi-level storage architecture and a distributed database approach.

Critical to the design of the PACS database system is the observation that in a radiological examination reading, radiologists usually compare a newly generated examination (image) with previous examinations (images) of the same patient. Based on this observation, the retrieval of old images is a critical design requirement of PACS.

In current film-based radiology systems, such retrieval is initially performed by nurses or assistants, who hang the most recent images on alternators for reading. During reading, radiologists may dig into film jackets and fan through other old images for additional relevant images. To effectively support digital primary reading using a PACS, it is essential to identify relevant previous patient images that can be either pre-fetched off-line or retrieved on-line to arrive for current diagnosis and to reduce the significant delay caused when access is obtained through a slow and remote storage device in a hierarchical (multi-level) and distributed PACS database system.

Effective patient image retrieval depends upon the radiologists' expert knowledge, which enables them to select images for comparison based on information about the new images (to be diagnosed), the patient and previous images. The implementation of the PACS system using a knowledge-based approach based on the expert knowledge of radiologists would provide the advantages of (1) reducing system response time, (2) reducing radiologists' time in selecting images for review, (3) minimizing the turnaround time of the exam interpretation function, and (4) improving the diagnostic effectiveness and quality by providing relevant and sufficient images automatically.

A precursor to the present invention is described in Sheng, Ovitt, Wang, and Garcia, Image Retrieval Expert Systems, Proc. SCAR 90 (Computer Applications to Assist Radiology), edited by Arenson and Friedenberg, pp. 198–204, and Sheng, Wang, and Garcia, IRES—Image Retrieval Expert System, Proc. SPIE Medical Imaging IV Conference, Feb. 4–9, 1990, pp. 832–841. The knowledge-based system for the retrieval of images, Image Retrieval Expert System (IRES), described was prototyped using three major components: databases, a procedural control algorithm, and a rule base. Although the capability of knowledge-based processing was added to the PACS, the design of IRES using a flat rule base resulted in problems with maintainability and extensibility of the system due to the lack of defined relationships among rules and the redundancy inherent in rule based systems. Further, the lack of a structured rule organization in the IRES rule base according to natural rule characterization and relationships negatively impacted upon the efficient design of knowledge inferencing procedures and severely hampered the extendibility of the knowledge-base to include a larger set of rules.

It is a known fact that as the structures and manipulations of databases become more complex and the size of knowledge-bases increase, as, for example, in the rule based IRES discussed above, existing separate database and knowledge-base design technologies become inadequate. In an effort to provide information systems having large, complex databases with knowledge processing capabilities, attempts have been made to couple knowledge-base and database design. Coupling knowledge-base and database design provides the advantages of (1) improving data management by using knowledge-base technologies to manage complex relationships among data and to perform deductive data processing, and (2) improving knowledge management by using database techniques to maintain the factual data imbedded in knowledge, thereby reducing the size and improving the extensibility and maintainability of knowledge-bases.

Modeling or representation of data and knowledge relationships is critical to the design of coupled knowledge-base/database systems. Modeling any less than all of the knowledge on data and knowledge interactions for a given application domain (1) severely restricts the maintainability and extensibility of the system, (2) limits the advantages realized by knowledge-base/database coupling, (3) greatly increases the burden on system designers/developers during the design and development stages, and (4) substantially increases the likelihood of errors in implementation.

Attempts to model data and knowledge relationships in designing coupled knowledge-base/database systems are characterized, generally, by the application of (1) semantic data modeling techniques or (2) object-oriented techniques to represent the knowledge/data relationships.

Semantic data modeling uses semantic models for representing structurally complex interrelationships among data. The primary components of semantic models are the explicit representation of objects, attributes of and relationships among objects, type constructors for building complex types, IS-A relationships, and derived schema components. An example of a semantic data model is the Entity-Relationship (ER) model. The ER model and other semantic data models and modeling techniques of the above-described type are discussed in Hull and King, Semantic Database Modeling: Survey, Applications, and Research Issues, ACM Computing Surveys, Vol. 19, No. 3, pp. 201–60, September 1987; and Peckham and Maryanski, Semantic Data Models, ACM Computing Surveys, Vol. 20, No. 3, pp. 153–89, September 1988. Although semantic data modeling provides a technique for effectively modeling the structural aspects of objects, no construct or mechanism is provided for representing the behavioral aspects of objects exhibited during knowledge and data interactions. This inherent limitation in the semantic data model precludes modeling of a substantial part of the knowledge exhibited during data and knowledge interactions. Further, the available semantic data modeling techniques are limited in the types of relationships among objects that can be represented and provide no mechanism for sharing of properties and methods among objects by inheritance.

Object-oriented modeling techniques have been applied to database designs to represent data relationships and their behavior. The Object-Oriented Entity-Relationship Model (OOERM), discussed in Gorman and Choobineh, An Overview of the Object-Oriented Entity Relationship Model (OOERM), Proceedings of the Twenty-Third Annual Hawaii International Conference on System Sciences, 1990, pp. 336–345, extended the Entity-Relationship (ER) model by using object-oriented constructs to model the operational properties of entities or objects for the purpose of database design. Because the ER model has been frequently used in database design methods, its object-oriented extension in the OOERM permits application of existing ER-based design concepts, while adding object-oriented principles to dictate entity behavior (procedures, rules or operation). The Object Modeling Technique (OMT), discussed in Blaha, Premerlani, and Rumbaugh, Relational Database Design Using An Object-Oriented Methodology, Communications of ACM, Vol. 31, No. 4, pp. 414–27, April 1988, similarly incorporated the main concepts of the ER model into an object-oriented model and associated design methods that model both the static (passive) and behavioral (active) properties of entities for software system and relational database designs. The application of object-oriented modeling techniques for database design provides the advantage of natural abstraction representation, data/behavior encapsulation and superclass-subclass inheritance features. However, these techniques (OOERM and OMT) cannot be effectively used to model coupled knowledge-base/database systems due to the limited types of entity or object behavior represented. This limitation of the OOERM and OMT precludes modeling of a crucial part of the knowledge exhibited during data and knowledge interactions.

Another object-oriented design method, the Structured Object Model (SOM), discussed in Higa, Morrision, Morrison, and Sheng, An Object-Oriented Methodology for Knowledge Base/Database Coupling, Working Paper, University of Arizona, 1990, and Morrison, Morrison, and Sheng, A Hierarchical Object-Oriented Knowledge-Based Architecture for Coupled Knowledge-Base/Database Systems, University of Arizona, Working Paper Series, 1990, has been used for modeling coupled knowledge-base/database systems. In the SOM design method, data semantics are represented using objects, attributes, and two types of relationships (aspect and specialization). Although this model provides the advantages associated with the object-oriented modeling method, the modeling constructs and the design procedures for the knowledge-base components are incomplete and imprecise, and cannot effectively represent the domain expert knowledge and data and knowledge relationships. Further, the problem solving control knowledge for performing the reasoning process in an object-oriented coupled knowledge-base/database system is not defined and no method for modeling such knowledge is described, as the systems were implemented using expert systems shells coupled with database management systems (DBMS).

Notwithstanding the available coupled knowledge-base/database design methods, there is a need for a method of designing a coupled knowledge-base/database system that provides (1) a mechanism for modeling all of the knowledge on data and knowledge interactions for a given application domain, (2) a defined construct for modeling all the knowledge, (3) a mechanism for sharing of properties and methods among objects by inheritance, and (4) a schema for the coupled database. Further, there is a need for a knowledge-based system and method for the retrieval of images that uses a coupled knowledge-base/database system having a knowledge-base storing all of the knowledge on data and knowledge interactions for the image retrieval process and a coupled database having a schema derived from the knowledge-base.

SUMMARY OF THE INVENTION

The primary object of the present invention is to overcome the deficiencies of the prior art described above by providing a method for designing a coupled knowledge-base/database system for use in a knowledge-based system for the retrieval of images that can effectively provide knowledge processing capabilities in information systems having large complex knowledge-bases and databases.

Another key object of the present invention is to provide a coupled knowledge-base/database design method and a system for image retrieval using a coupled knowledge-base/database that can be effectively and efficiently maintained and extended.

Still another key object of the invention is to provide a coupled knowledge-base/database design method and a system for image retrieval using a coupled knowledge-base/database that substantially reduces the burden on system designers/developers in the design, development, implementation, maintainability, and extendibility of knowledge-based information systems.

Yet another key object of the present invention is to provide a coupled knowledge-base/database design method and a system for image retrieval using a coupled knowledge-base/database that provides a mechanism for modeling all of the knowledge on data and knowledge interactions including knowledge involved in data processing, knowledge-based problem solving and object-oriented reasoning.

Another object of the invention is to provide a coupled knowledge-base/database design method and a system for image retrieval using a coupled knowledge-base/database having improved data and knowledge management and the capability of performing deductive data processing.

Still another object of the present invention is to provide a coupled knowledge-base/database design method and a system for image retrieval using a coupled knowledge-base/database having the capability of minimizing knowledge-base and database sizes through sharing of properties and methods among objects by inheritance.

Another object of the present invention is to provide a coupled knowledge-base/database design method and a system for image retrieval using a coupled knowledge-base/database that is not limited in the types of entity or object behavior or in the relationships among entities or objects that can be represented.

Yet another object of the present invention is to provide a coupled knowledge-base/database design method and a system for image retrieval using a coupled knowledge-base/database that provides a structured approach and a well-defined construct for modeling the domain expert knowledge on data processing, knowledge-based problem solving and object-oriented reasoning.

Yet another object of the present invention is to provide a coupled knowledge-base/database design method and a system for image retrieval using a coupled knowledge-base/database that can effectively bind data and knowledge interactions.

Still another object of the present invention is to facilitate the method of design of coupled knowledge-base/databases and to reduce errors in the implementation of coupling knowledge-base and database by providing a modeled knowledge-base structure from which a schema for the coupled database can be derived.

Another object of the present invention is to provide a method for designing a coupled knowledge-base/database and a system for image retrieval using a coupled knowledge-base/database representing structural knowledge as object classes having relationships and encapsulating general procedural, heuristic, and control knowledge within the object classes.

Yet another object of the present invention is to provide a method for designing a coupled knowledge-base/database and a system for image retrieval using a coupled knowledge-base/database, the knowledge-base storing expert knowledge information including structural knowledge on a plurality of classes, general procedural knowledge, heuristic knowledge stored in the form of rules, and control knowledge.

Still another object of the invention is to provide a coupled knowledge-base/database design method and a system for image retrieval using a coupled knowledge-base/database having the capability of effectively representing and using, during processing, domain expert knowledge on the relationships among objects including specialization, aggregation, and association relationships.

The present invention achieves these objects and others by providing a method for designing a coupled knowledge-base/database and system for the retrieval of images using a coupled knowledge-base/database, the method comprising the steps of modeling structural knowledge by identifying classes and attributes of classes, specifying an identifier for each class, determining relationships among the classes, and defining operations for each class; modeling heuristic and general procedural knowledge by acquiring heuristic rules for each class dependent on the application domain, specifying data processing procedures required by the heuristic rules acquired, representing the procedures specified on the classes and on the relationships among the classes, and representing the heuristic rules in an "IF-THEN" format and using the procedures and operations defined; modeling control knowledge by specifying intra-class-hierarchy searching paths, specifying inter-class-hierarchy searching paths, and representing the specified searching paths in triggers for each class; and deriving a schema for the coupled database from the structural knowledge. The method for designing a coupled knowledge-base/database system of the present invention is applicable to general expert systems, multimedia information systems applications and the like. The knowledge-based system for the retrieval of images provided includes a coupled knowledge-base/database and comprises a knowledge-base storing expert knowledge information including structural knowledge, general procedural knowledge, heuristic knowledge, and control knowledge; a database storing patient information; a knowledge-base/database interface for coupling the database to the knowledge-base; reasoning means to search the classes for selecting rules; retrieving means for retrieving the examination data; a user interface; and a control interface for coupling the user interface to the knowledge-base.

In a preferred embodiment the present invention provides a method for designing a coupled knowledge-base/database and knowledge-based system for the retrieval of images based on expert knowledge and patient information stored in a computer system, the knowledge-based system comprising a knowledge-base storing the expert knowledge information including structural knowledge on a plurality of classes, general procedural knowledge, heuristic knowledge stored in the form of rules, and control knowledge; a database storing the patient information including patient data, examination data and images; a knowledge-base/database interface for coupling the database to the knowledge-base for receiving and transmitting information therebetween; reasoning means to search the plurality of classes stored in the knowledge-base for selecting rules based on the stored control knowledge, structural knowledge and general procedural knowledge, and the stored patient information; retrieving means to search the patient information stored in the database for retrieving the patient information indicated by the execution of the rules selected by the reasoning means; a user interface for accessing stored patient information from the database and outputting the patient information retrieved by the retrieving means; and a control interface for coupling the user interface to the knowledge-base for receiving and transmitting information and controlling the flow of information therebetween. The structural knowledge includes attribute information, operations information, and relationship information on the plurality of classes. The relationships among the classes represented in the relationship information are association relationships, specialization relationships, and aggregation relationships. The general procedural knowledge includes information on a plurality of data processing procedures performed on the classes. The data processing procedures includes query, update, arithmetic, and statistical operations for performing on the classes and relationships among the classes. The heuristic knowledge includes information on reasoning processes for determining the images to be retrieved. The stored rules are in an "IF-THEN" format and each rule selected during reasoning is executed upon satisfaction of the "IF" condition of the rule. The control knowledge includes information on searching the plurality of classes and dynamically creating new classes during operation of the knowledge-based system. The user interface includes means for displaying the images retrieved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table illustrating structural knowledge modeled in a knowledge-based system according to the present invention.

FIG. 4 is a table illustrating general procedural knowledge modeled in a knowledge-based system according to the present invention.

FIG. 20 is a flow diagram of the steps for modeling control knowledge for designing a SOOER model for a coupled knowledge-base/database system according to the present invention.

FIG. 21 is an illustration of the relational schema of the coupled database for a knowledge-based system according to the present invention.

FIG. 22 is a flow diagram of the operation of a knowledge-based system according to the present invention.

FIG. 23 is a flow diagram of the reasoning process of a knowledge-based system according to the present invention.

DESCRIPTION OF THE PREFERRED EMBODIMENTS

Figure 1:
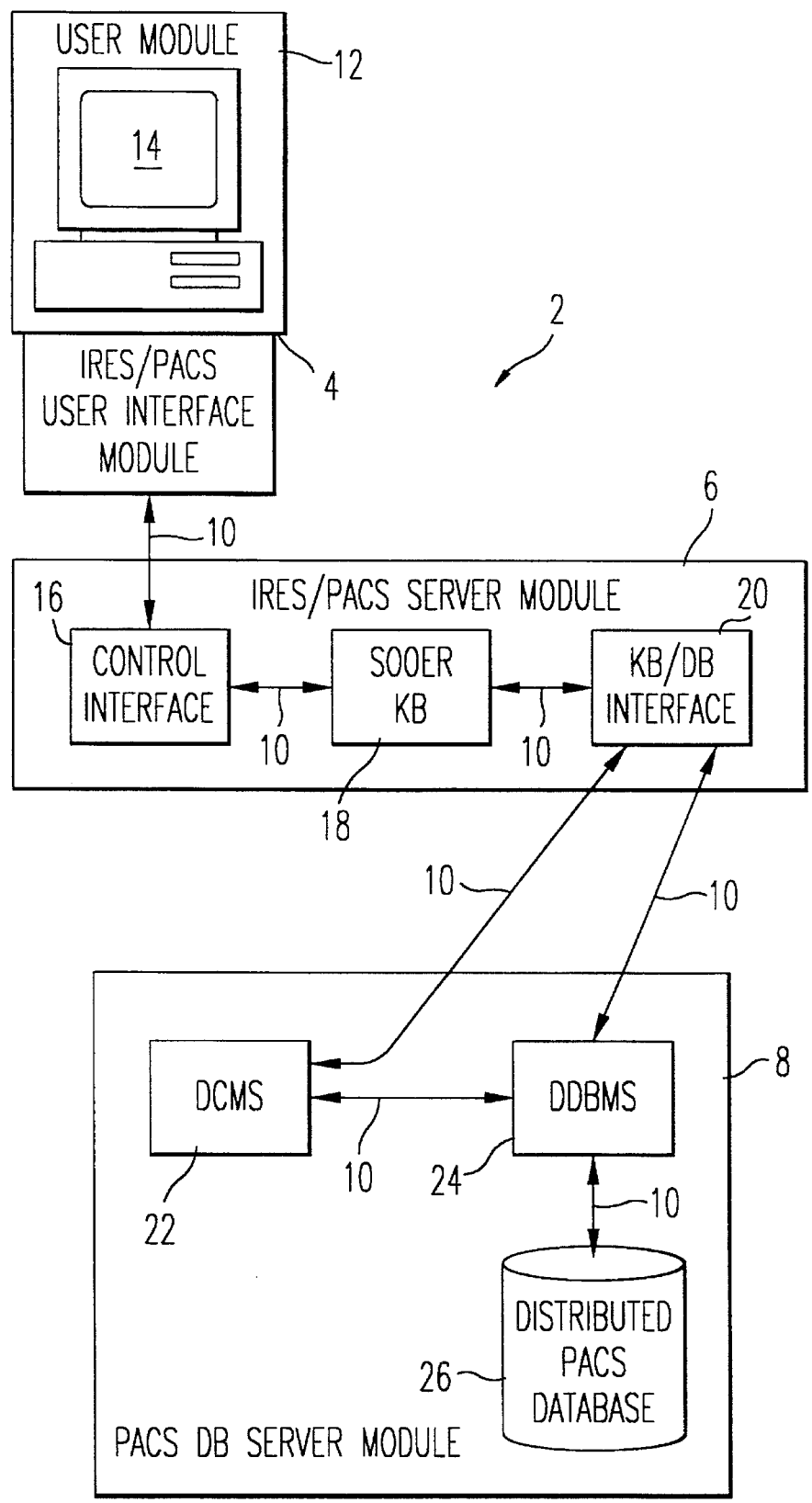
FIG. 1 is a block diagram of the architecture for a knowledge-based system for the retrieval of images according to the present invention.

With reference to FIG. 1, a block diagram of the structure of a knowledge-based system 2 for the retrieval of images is shown. The knowledge-based system 2 is comprised of a plurality of modules linked together to form a network. The system is highly modularized in order to realize efficient knowledge and data interactions during image retrieval in a distributed environment. In particular, the system 2 includes three main modules—an IRES/PACS user interface module 4, an IRES server module 6 and a PACS DB server module 8. The modules are coupled to one another by data flow links 10. The IRES/PACS user interface module 4 is the means through which users of the system issue commands, access patient information and view retrieved examination data and images. The IRES server module 6 performs the function of knowledge-based image retrieval. The PACS DB server module 8 provides data management services, generally, storage of patient information. The structure and operation of the main modules 4, 6, and 8 of the knowledge-based image retrieval system 2 will be described in greater detail hereinafter.

The IRES/PACS user interface module 4 includes a user module 12 having a control console 14, such as a computer terminal, personal computer, mini computer, mainframe computer, or any other type of computer system. The knowledge-based system 2 of the present invention for the retrieval of patient images is for use, primarily, by radiologists/referring physicians, radiological technicians, and receptionists requiring patient information, such as, for example, patient data, examination data, or images. The control console 14 will have, generally, an input means such as a keyboard, mouse, touchscreen, or any other well-known input device for a system user to issue commands to or enter information into the system, and an output means, such as a CRT, or any other well-known output device, for displaying the patient information. The control console 14 may also include a CPU and memory, generally in the form of a ROM or RAM, for processing retrieved patient information, storage means, such as a disk drive, hard drive, CD-ROM drive or any other well-known storage device, and image equipment for displaying patient images. The IRES/PACS user interface module 4 controls the flow of data through flow link 10 to and from the IRES server module 6.

The IRES server module 6 comprises a control interface 16, a Synthesized Object-Oriented Entity-Relationship Knowledge-Base ("SOOER KB") 18 and a Knowledge-base/Database (KB/DB) interface 20. The control interface 16 controls the flow of data between the IRES/PACS user interface module 4 and the IRES server module 6. The SOOER KB 18 stores domain expert (intensional) knowledge on the process of selecting stored patient images for review by a radiologist during the primary reading of a patient's current or new images. The SOOER KB 18 stores the expert knowledge according to the SOOER method for designing coupled knowledge-base/database systems. The domain expert knowledge for image retrieval applications and SOOER model and design method will be described in greater detail hereinafter. The KB/DB interface 20 controls the interactions and data flow between the SOOER KB 18 and the PACS DB server module 8.

The PACS DB server module 8 includes a Distributed Catalogue Management System (DCMS) 22, a Distributed Database Management System (DDBMS) 24, and a distributed PACS database (DB) 26. The PACS DB 26 stores patient information including patient data, examination data, and patient images. The DCMS 22 is coupled to the IRES server module 6 through data flow link 10 and stores the metadata of the PACS DB 26. By coupling the DCMS 22 and IRES server module 6, the SOOER KB 18 can interface the DCMS 22 to preserve network transparency for IRES data and knowledge interactions. The DDBMS 24 is also coupled to the IRES server module 6 through a data flow link 10. The patient information is stored in the PACS DB 26 in a relational DB organization with an object-oriented interpretation. The SOOER model for the knowledge-based image retrieval system 2 of the present invention is used to derive the relational schema and object-oriented-to-relational mapping of the PACS DB 26, as will be described in greater detail hereinafter.

Figure 2:
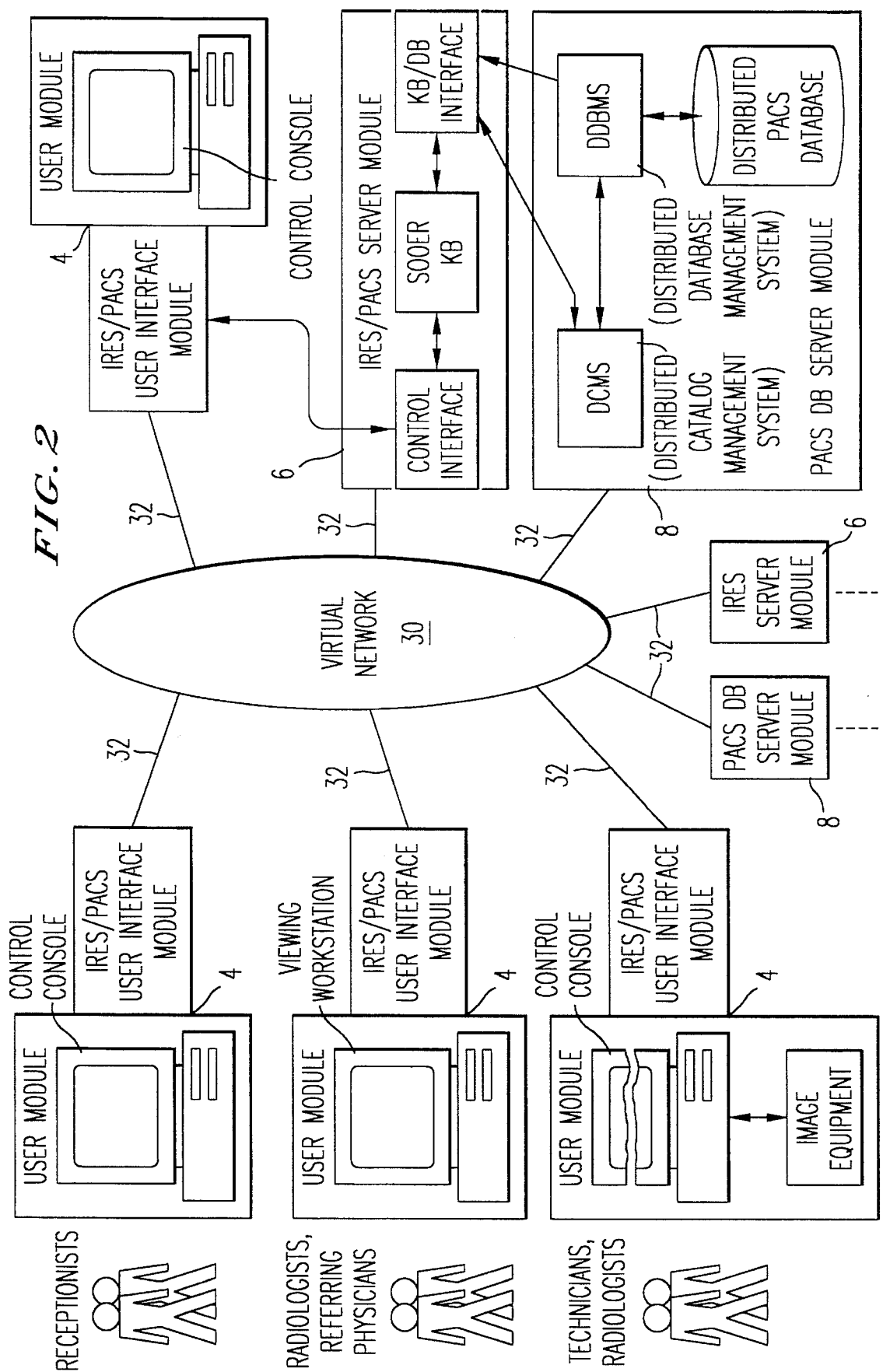
FIG. 2 is a block diagram of the architecture for a knowledge-based system for the retrieval of images according to the present invention in a network environment.

Referring to FIG. 2, the knowledge-based system 2 for the retrieval of images, can be connected to a virtual network 30. The virtual network includes communication systems such as local area networks, wide area networks, public access networks, or other well-known systems, and the connections in such networks include physical, logical, virtual links or the like, all of which would be readily apparent to one of ordinary skill in the art. The modularized design of the knowledge-based system 2 facilitates the implementation of the system in a network environment. Each of the modules described above, the IRES/PACS User Interface Module 4, the IRES Server Module 6 and the PACS DB Server Module 8, can be connected, individually, to the virtual network 30, through network data flow links 32. The network data flow links 32 function in the same way as the data flow links 10, described above. By implementing the system in a network environment, users located at remote sites such as, doctor's offices or different hospitals, or in different parts or departments in, for example, one hospital can access patient information stored in any one of the PACS DB's 26 available on the virtual network 30.

The development of a knowledge-based system starts with knowledge acquisition, the purposes of which are to obtain domain expert knowledge for building the knowledge-base and to identify requirements and implications for the knowledge-base design. By identifying the knowledge used and the way it is used by the expert (referred to as cognitive process analysis), a generalized process model can be formulated. Knowledge elements, referring to the kinds of knowledge the subject has about the task, and operator elements, which are a finite set of actions that transform knowledge elements to other knowledge elements, are identified and various process models for performing various tasks are formulated.

The relationships among the knowledge elements and the various forms of knowledge are derived from the cognitive process model and considered in conjunction with the physical characteristics of the environment in which the information retrieval system operates. The SOOER model and design method provide mechanisms for the representation of the various forms of knowledge for the implementation of a knowledge-based system which can efficiently and effectively perform the desired task.

In the SOOER model and method of the present invention, a coupled KB/DB is designed which provides the knowledge-based system with the capability to represent the four forms of knowledge (intensional). The four forms of knowledge represented are structural knowledge, heuristic knowledge, general procedural knowledge, and control knowledge.

Generally, structural knowledge includes information about entities and the relationships between such entities. The term "entity" refers to a distinct thing, object or concept. With reference to FIG. 3, the information about entities that comprises the structural knowledge is shown. Specifically, the entity information includes an entity name 50 and entity properties 52. FIG. 3 illustrates several examples of the structural knowledge which is modeled in applying the SOOER method to an image retrieval expert system. The entity names Patient 54, Examination 56, and Image 58 are identified. The entity Patient 56 includes the properties Patient ID #60, Name 62, Address 64, Date of birth 66, and Sex 68. The entity Examination 56 includes the properties Exam ID #70, Completion date 72, Procedure code 74, Reason 76, and Diagnosis 78. The entity Image 58 includes the properties Image ID #80, Date 82, and Time 84. The relationship between the entities Patient 54, Examination 56, and Image 58 is expressed:

A Patient has many Examinations.

An Examination only belongs to one Patient.

An Examination includes many Images.

The second type of knowledge which is modeled in the method of designing a coupled KB/DB, the general procedural knowledge, is defined, generally, as knowledge about procedures performed on the data stored in the coupled KB/DB system. Examples of data processing procedures for an image retrieval expert system are illustrated in FIG. 4. The data processing procedures may be data operations, such as queries, updates, arithmetic operations or statistical analysis, and may be performed on individual entities or on entity relationships. Referring to FIG. 4, an example of a procedure 86 performed on the entity Patient 54 is illustrated. The value for the property Name 62 is selected from the entity Patient 54 where the value for the property Patient ID #60 equals '12345678'. A second procedure 88 operated on a relationship is illustrated, wherein the Exam ID #70, a property of the entity Examination 56, is selected from the patient-examination relationship 90, where the value for the Patient ID #60, a property of the entity Patient 54, equals '12345678'. The procedure 88 specifies further that the exam ID #70 selected will be ordered by the value for their property Completion Date 72.

The heuristic knowledge is defined, generally, as knowledge about the expertise of domain experts. An example of heuristic knowledge in a patient radiographic examinations retrieval application is illustrated in the following statement:

If the patient's age is less than 7

Then retrieve all examinations of the patient.

The heuristic knowledge shown is in the form of a rule in an "IF-THEN" format.

The last of the forms of knowledge that is modeled in the SOOER method is control knowledge. Generally, the control knowledge includes knowledge used to determine the process of heuristic knowledge reasoning. This knowledge defines the searching paths or order in which entities or classes are searched. The four forms of knowledge are closely related in that the control knowledge uses the heuristic, the general procedural, and the structural knowledge; the heuristic knowledge uses the general procedural knowledge; and the general procedural knowledge uses the structural knowledge. The SOOER model and design method enables the efficient and effective representation of the four forms of knowledge in a format that accounts for the dependencies of the different types of knowledge. The SOOER model and design method effectively supports extrapolation of high-level knowledge from low-level knowledge and accessing of low-level knowledge during the inferencing of high-level knowledge.

In the SOOER model and design method, the structural knowledge is represented using object classes and their relationships, and the general procedural, the heuristic, and the control knowledge is encapsulated within the object classes involved. FIGS. 5–14 illustrate the modeling and relationship constructs of the four forms of knowledge in the SOOER model and design method according to the present invention.

Figure 5:
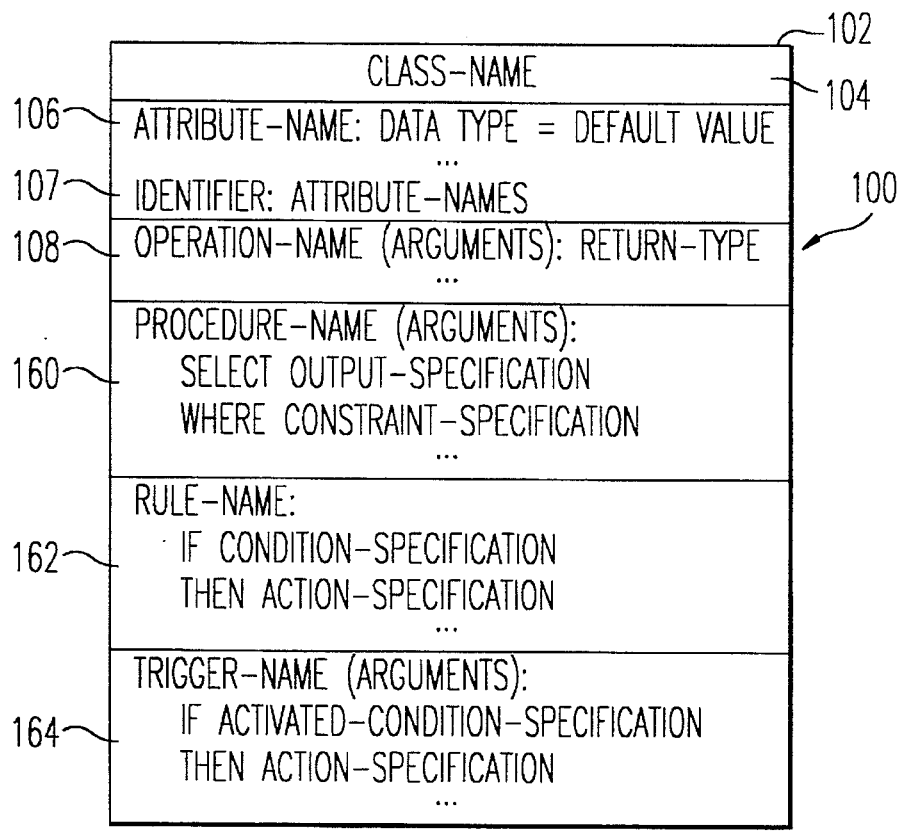
FIG. 5 is an illustration of the structure for a SOOER modeling construct for classes according to the present invention.

Referring to FIG. 5, the modeling construct for classes in the SOOER model and design method is shown. As discussed above, structural knowledge includes entity information and information on the relationship between entities. Objects and classes are used to represent the structural knowledge.

An object embodies both data and behavior. A group of objects which have similar characteristics (attributes), common behavior (operations), and common relationships to other objects are grouped into a class. Classes have relationships with other classes. An object is related to other objects through relationships defined for its class. A class 100 is represented by a box 102 with a class-name 104, as shown in FIG. 5. A class includes a set of attribute specifications expressed in the format:

Attribute-name: data-type=default-value.

Attributes 106 are listed under the class-name 104 in the class box 102. A class also includes an identifier 107. An attribute 106 can be designated as an identifier 107 for a class if the value of that attribute will be unique for each entry or instance in the class. The identifier 107 and its function will be described in greater detail hereinafter with reference to FIG. 6.

Figure 6A:
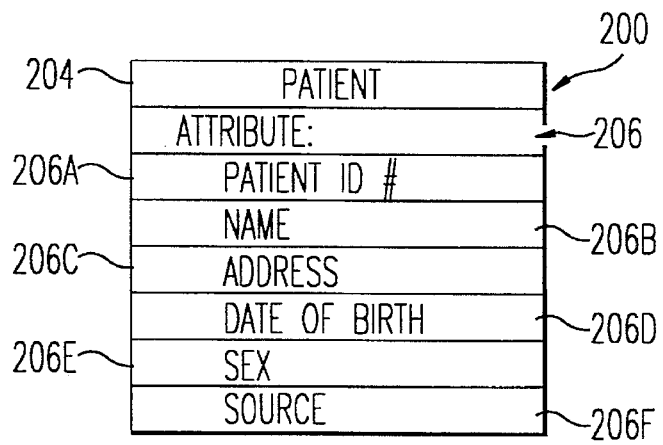
FIG. 6 is an illustration of a SOOER modeling construct for classes according to the present invention modeling structural knowledge.
Figure 6B:
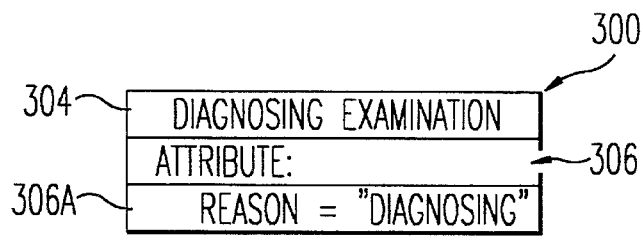

FIG. 6 illustrates two examples of a class 100 in the knowledge-based system for the retrieval of images according to the present invention. A first class 200 with the class-name 204 Patient is shown. The attributes 206 are Patient-ID#206A, Name 206B, Address 206C, Date-of-birth 206D, Sex 206E, and Source 206F. The identifier 207 for the patient class, which is designated by the attribute underlined, is the Patient-ID # attribute 206A. The Patient-ID # attribute 206A uniquely identifies each instance (i.e., patient) in the Patient class 204. The other attributes (206B–F) in the Patient class 204 could not be designated as an identifier for the class because they do not uniquely identify each instance in the class (i.e., two patients could have the same name, same address, same date-of-birth, etc.). In this example no default-values for the attributes are given.

The second class 300 illustrated has class-name 304 Diagnosing Examination. The only attribute 306 is Reason 306A. In this example, a default-value for the attribute Reason 306A is given. The default-value is "Diagnosing."

An operation is defined as a function or transformation that may be applied to or by objects in a class. All objects in a class include the same operations. Operations are expressed in the format:

Operation-name (arguments): return-type.

Operations 108 are listed below the attributes 106 in the class box 102.

Figure 7:
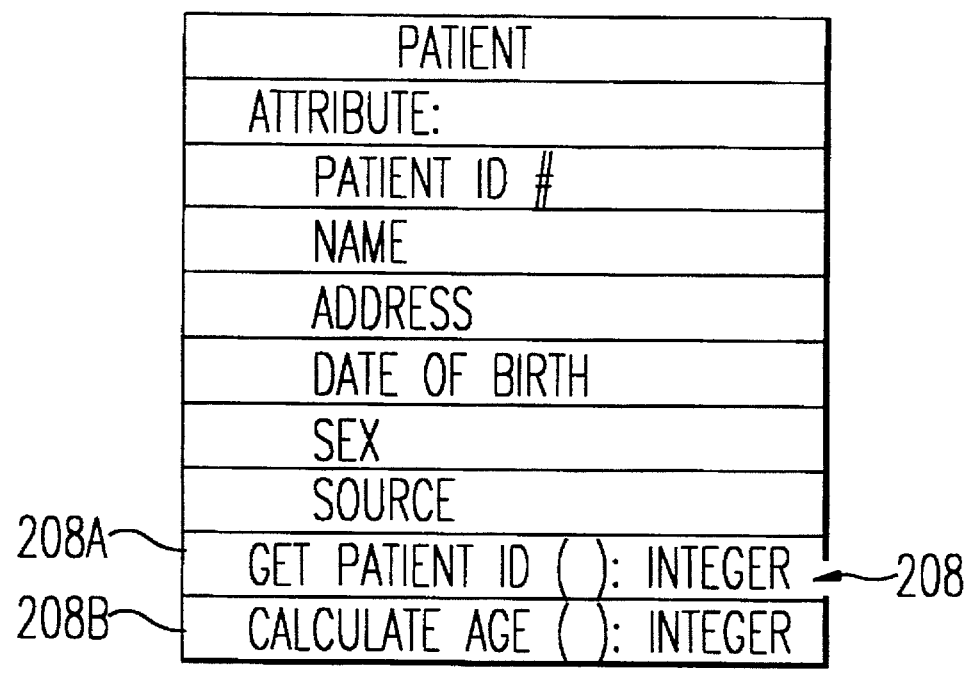
FIG. 7 is an illustration of a SOOER modeling construct for classes according to the present invention modeling structural knowledge.

FIG. 7 illustrates two examples of an operation 108 in the knowledge-based system for the retrieval of images according to the present invention. A first operation 208A with the operation-name GetPatientID is shown for returning a PatientID#. No arguments are given to the operation. The value returned has a data or return-type of integer. A second operation 208B with the operation name CalculateAge is shown for returning the age of a patient. No arguments are given to the operation. The value returned has a data or return-type of integer.

In the SOOER model and design method, the structural relationship knowledge is represented using three relationship constructs: association, specialization, and aggregation. A relationship is defined as a logical connection between or among classes.

Figure 8:
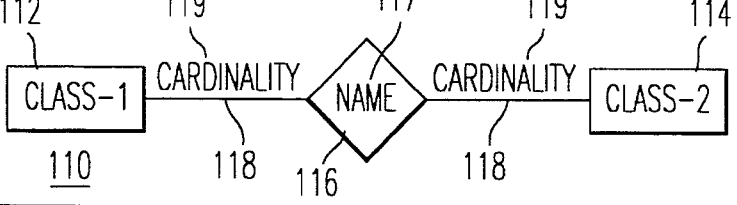
FIG. 8 is an illustration of SOOER modeling constructs for class relationships and procedures according to the present invention.

Referring to FIG. 8, an association relationship is defined as a relationship in which n classes are related to one another. FIG. 8 illustrates a binary association relationship 110 in which Class-1 112 and Class-2 114 are related to one another. A binary association is represented by a diamond 116 with lines 118 connecting the two related classes. A name 117 is specified in the diamond 116 that describes the specific type of relationship between the connected classes. Examples of types of relationships (i.e., values for the name 117) include "own", "has", "assign", "is for", and "take by". The relationship between the connected classes is also expressed in terms of the size or number of instances in one class as it relates to the size or number of instances in a related class. This is represented by specifying a value 119 where the lines 118 connect to the related classes. The different types of relationships will be described in greater detail hereinafter with reference to FIG. 9.

Figure 9A:
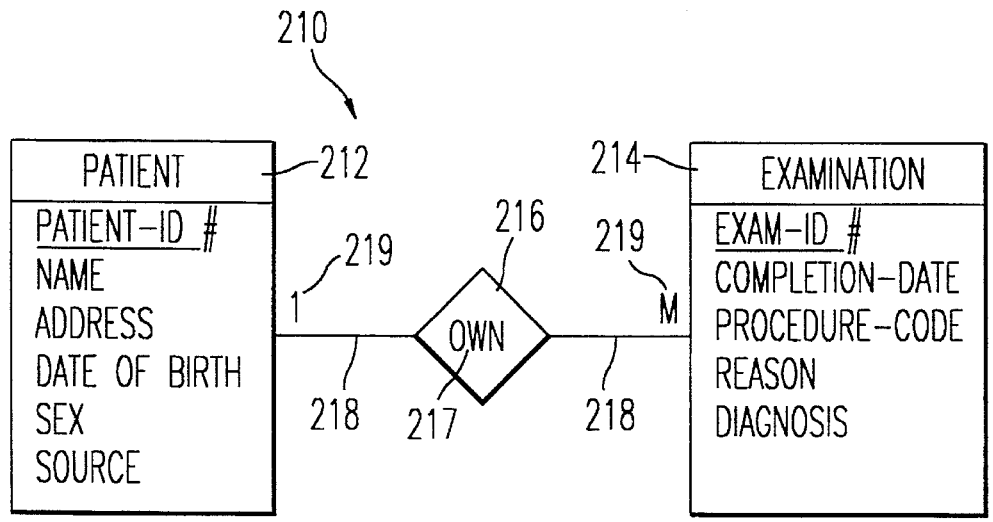
FIG. 9 is an illustration of a SOOER modeling construct for class relationships according to the present invention modeling a binary association relationship.
Figure 9B:
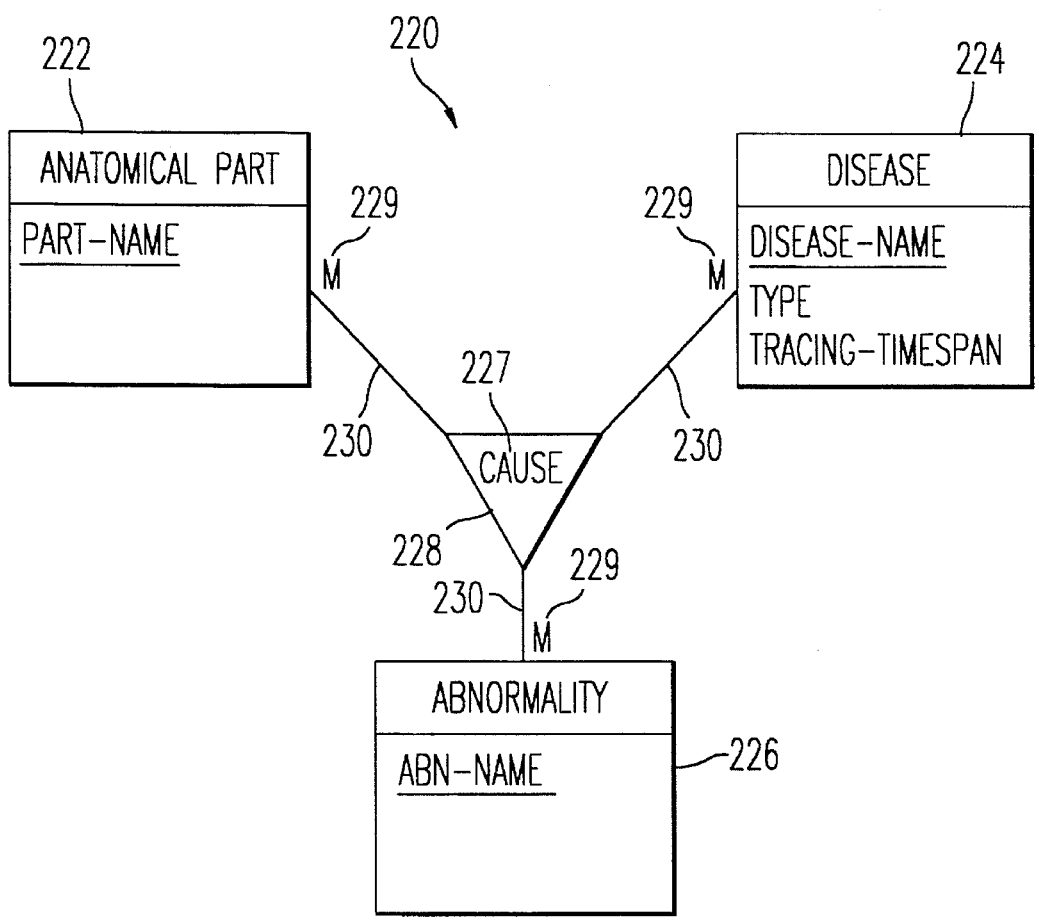

FIG. 9 is an example of a binary association relationship 210 between the Patient class 212 and the Examination class 214. The name 217, which represents the type of relationship, is specified as "own". The size or number of instances 219 for the patient class 212 is specified as "1" and for the examination class 214 is specified as "m" meaning many. The relationship is interpreted as:

Each PATIENT can own many EXAMINATIONS, and Each

EXAMINATION is only owned by one and only one PATIENT.

Referring back to FIG. 8, a ternary association relationship 120 among three classes: Class-1 122, Class-2 124, and Class-3 126 is shown in FIG. 8. A ternary association relationship is represented by a triangle 128 with lines 130 connecting the three related classes. A name 127 is specified in the triangle 128 that describes the specific type of relationship between the connected classes. Examples of types of relationships (i.e., values for the name 127) include "use for" and "cause." The relationship between the connected classes is also expressed in terms of the size or number of instances in one class as it relates to the size or number of instances in related classes. This is represented by specifying a value 129 where the lines 130 connect to the related classes. The different types of relationships will be described in greater detail hereinafter with reference to FIG. 9.

Referring to FIG. 9, an example of a ternary association relationship 220 between the Anatomical Part class 222, the Disease class 224, and the Abnormality class 226 is illustrated. The name 227, which represents the type of relationship, is specified as "cause." The size or number of instances 229 for the Anatomical part class 222 is specified as "m", for the Disease class 224 is specified as "m", and for the Abnormality class 226 is specified as "m." The relationship is interpreted as:

Many ANATOMICAL PARTS and many DISEASES cause many ABNORMALITIES

Figure 10:
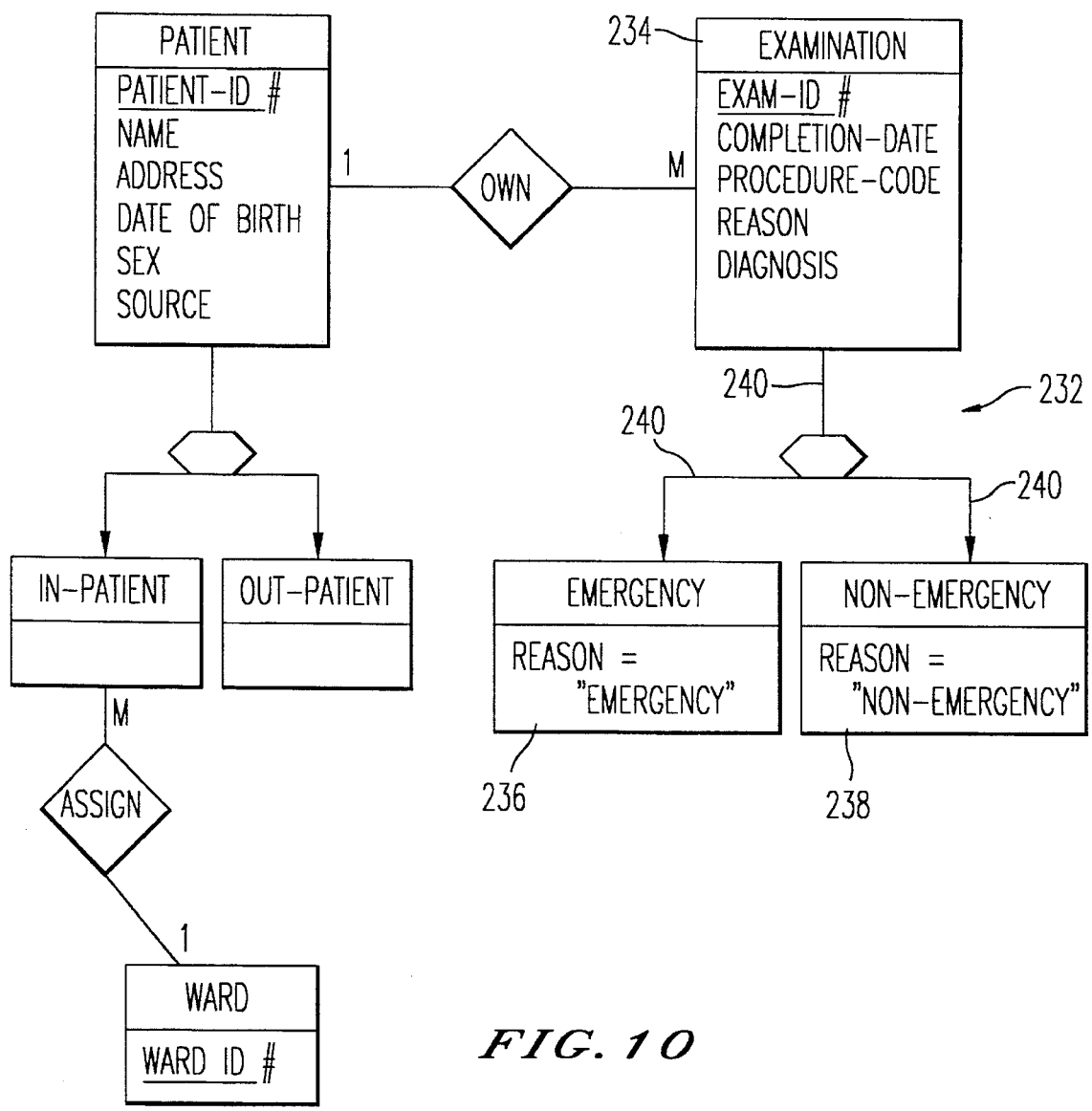
FIG. 10 is an illustration of a SOOER modeling construct for class relationships according to the present invention modeling a specialization relationship.

A specialization relationship categorizes a general class into several specialized classes. The general class is referred to as a superclass and each specialized class is a subclass of its general class. Specialization relationships are transitive and a subclass inherits attributes, operations, and relationships from its superclass. FIG. 8 illustrates a first specialization relationship 132, wherein a Superclass 134 has two Subclasses, Subclass-1 136 and Subclass-2 138. The first specialization relationship 132 is represented by a non-filled hexagon 139 with lines 140 connecting the related superclass and subclasses. The non-filled hexagon 139 represents a specialization relationship where the relationship between the subclasses is such that they are non-overlapping. Subclass-1 136 is not overlapped with subclass-2 138. FIG. 10 illustrates an example of the first kind of specialization relationship.

Referring to FIG. 10, the Examination superclass 234 has two subclasses, Emergency subclass 236 and Non-Emergency subclass 238. The hexagon 239 is not filled, since the Emergency subclass 236 is never overlapped with the Non-Emergency subclass 238. The examination is either an emergency examination or a non-emergency examination.

With reference again to FIG. 8, a second specialization relationship 141 is shown, wherein a superclass 142 has two subclasses, subclass-1 143 and subclass-2 144. The second specialization relationship is represented by a filled hexagon 145 with lines 146 connecting the related superclass and subclasses. The filled hexagon 145 represents a specialization relationship where the relationship between the subclasses is such that they are overlapped. Subclass-1 143 is overlapped with subclass-2 144.

The final relationship construct defined in the SOOER model and design method is the aggregation relationship. An aggregation relationship indicates that one or more classes, referred to as part classes, are "a-part-of" another class, referred to as an assembly class. The relationship of part classes to an assembly class is transitive. With reference to FIG. 8, an aggregation relationship 147 is shown. The filled diamond 152 attached to the Assembly Class 148 with lines 154 connecting the Part Class-1 150 and Part Class-2 151 thereto illustrates an aggregation relationship. The relationship between an assembly class 148 and a connected Part-class 150 or 151 is also expressed in terms of the size or number of instances in Part Class 150 or 151 relative to an Assembly class 148. This is represented by specifying a value 156 where the lines 154 connect to the Part classes 150 and 151.

Figure 11:
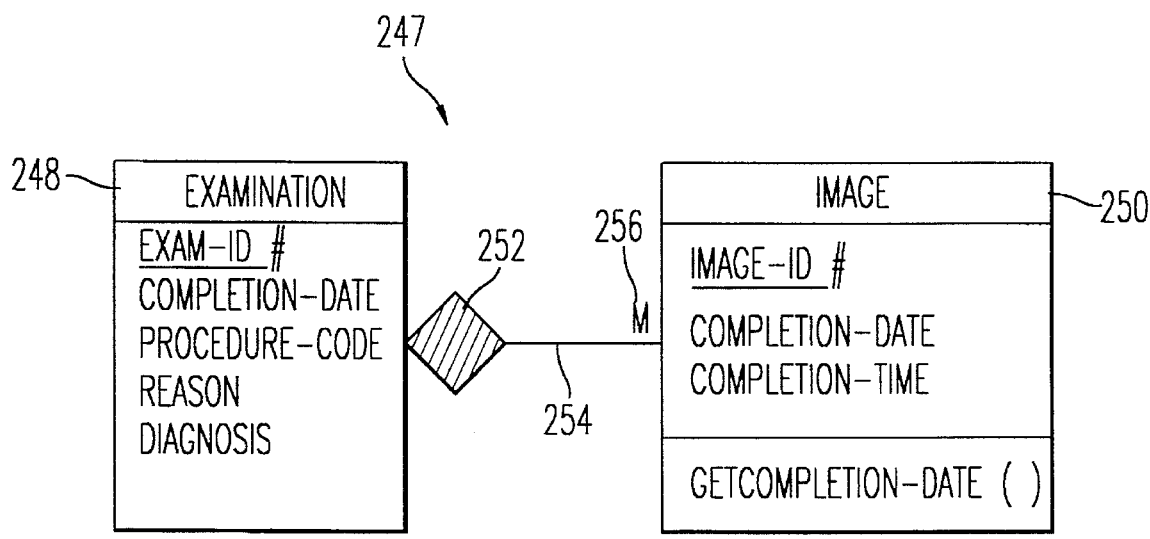
FIG. 11 is an illustration of a SOOER modeling construct for class relationships according to the present invention modeling an aggregation relationship.

FIG. 11 illustrates an example of an aggregation relationship 247 in the knowledge-based system for image retrieval of the present invention. The assembly class is the Examination class 248. One part class, Image class 250, is shown. A filled diamond 252 is attached to the Examination class 248 and a line 254 connects the Image class 250 thereto. The size or number of instances of the Image class 250 is specified as "m", for many The relationship is interpreted as:

Each EXAMINATION is an aggregate of many IMAGES.

Referring back to FIG. 5, the general procedural knowledge defined previously as knowledge about data processing procedures, is represented in the SOOER model and design method as procedures encapsulated within classes. As shown in the modeling construct 100 for SOOER classes, procedures 160 are listed below the operations 108 in the format:

Procedure-name (arguments):

SELECT output-specification

WHERE constraint-specification

Figure 12:
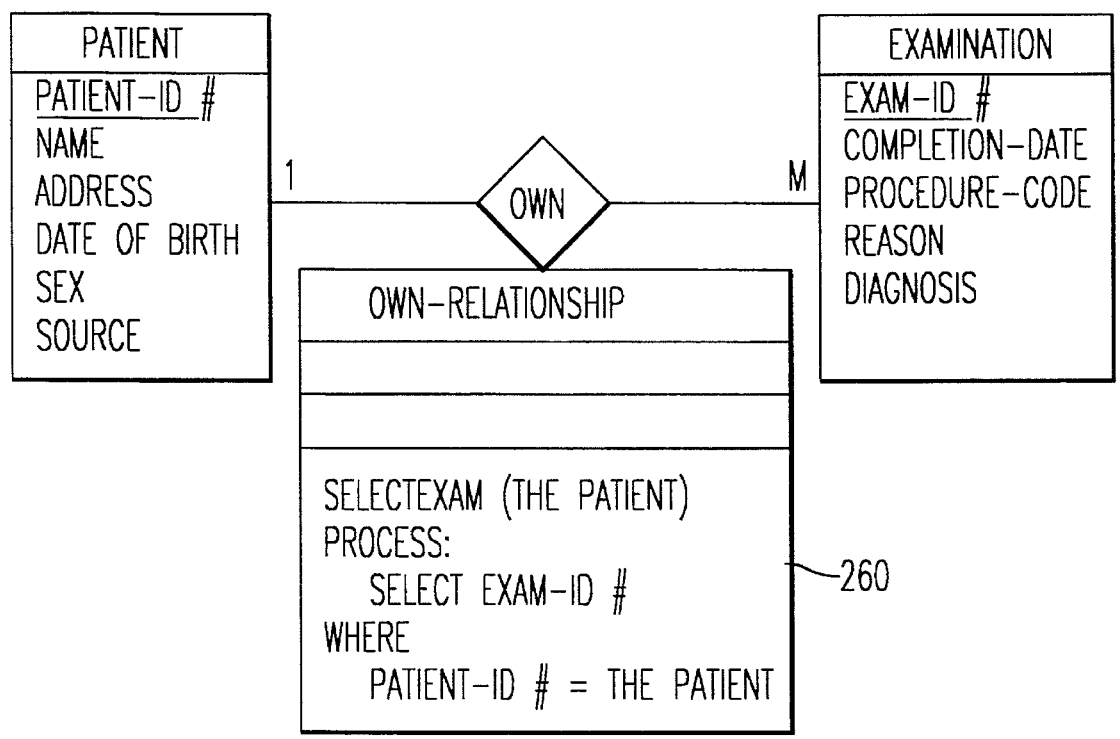
FIG. 12 is an illustration of a SOOER modeling construct for classes according to the present invention modeling general procedural knowledge.

FIG. 12 illustrates an example of a class in the knowledge-based image retrieval system of the present invention identifying a procedure 160. The Own-Relationship class, which is a relationship class because it is connected to a relationship among classes not directly to another class or group of classes, defines the SelectExam procedure 260. The SelectExam procedure 260 takes as an input parameter the patient ID#—the Patient—and retrieves a list of Exam-ID#s for that patient ID#.

Referring again to FIG. 5, each class has a set of rules which describe the heuristic pertaining to that class. Rules can be applied to objects in the class and the rules in a class are inherited by its subclasses. Rules 162 are listed under the Procedures 160 in the format:

Rule-name:

IF: condition-specification

THEN: action-specification

Figure 13:
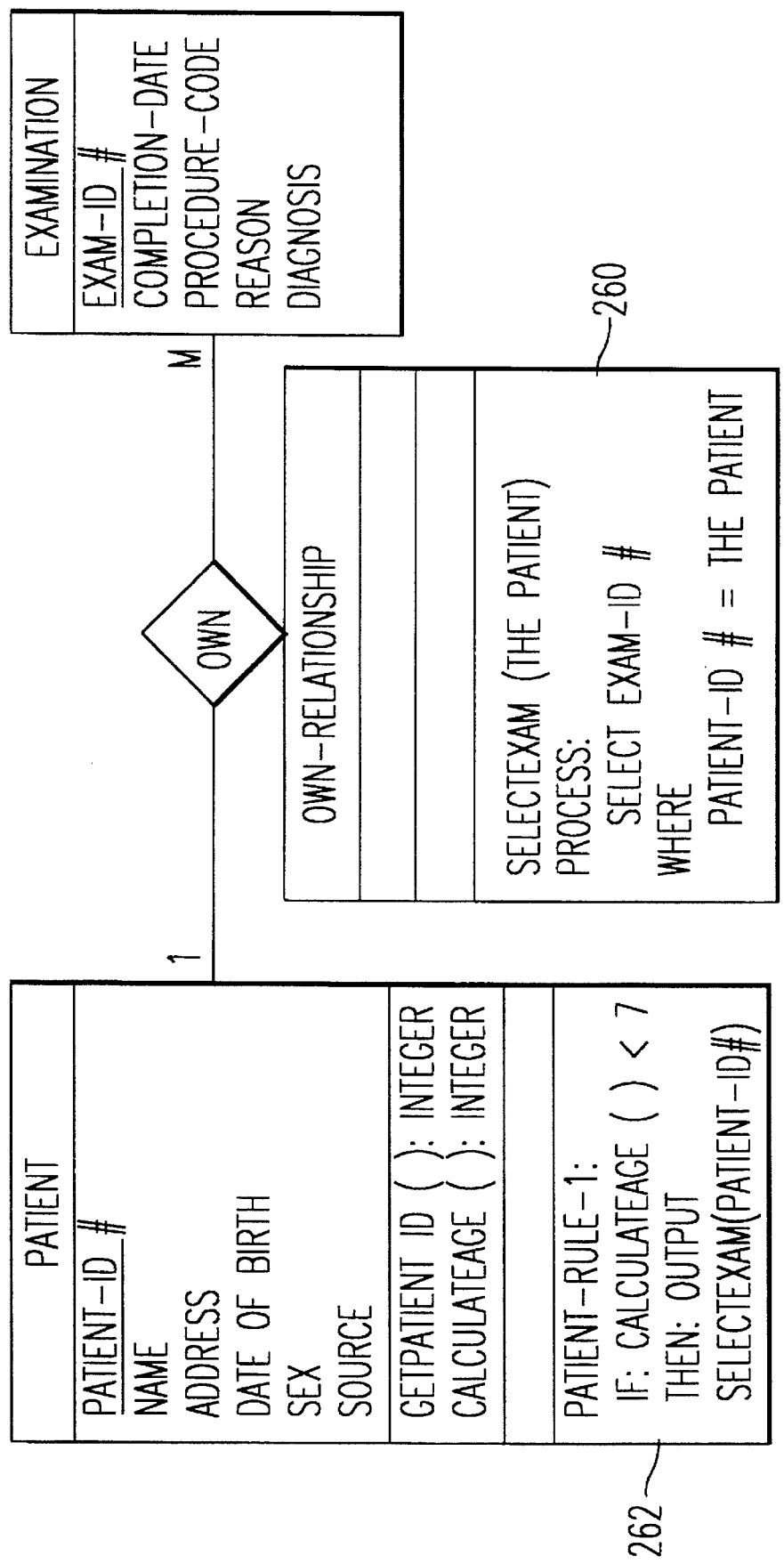
FIG. 13 is an illustration of a SOOER modeling construct for classes according to the present invention modeling heuristic knowledge.

FIG. 13 illustrates an example of a class including a rule. The Patient class lists the Patient-Rule-1 262 which gets the patient's age by applying the CalculateAge operation, and if the value for the patient's age returned is less than 7, all examination ID#'s of the patient are retrieved.

Turning again to FIG. 5, the control knowledge, which controls performing the functions of searching in class hierarchies and dynamically creating objects, is represented as Triggers, owned by classes. In the SOOER modeling construct for classes, Triggers 164 are listed under the rules 162 using the following format:

Trigger-name (arguments):
   IF: activated-condition-specification
   THEN: action-specification The activated-condition-specification 166 is used for the purpose of tracing the searching flow during the modeling and design phase and indicating the starting point of searching. The action-specification 168 for a class includes searching by activating other triggers and creating an object for the class.

Figure 14:
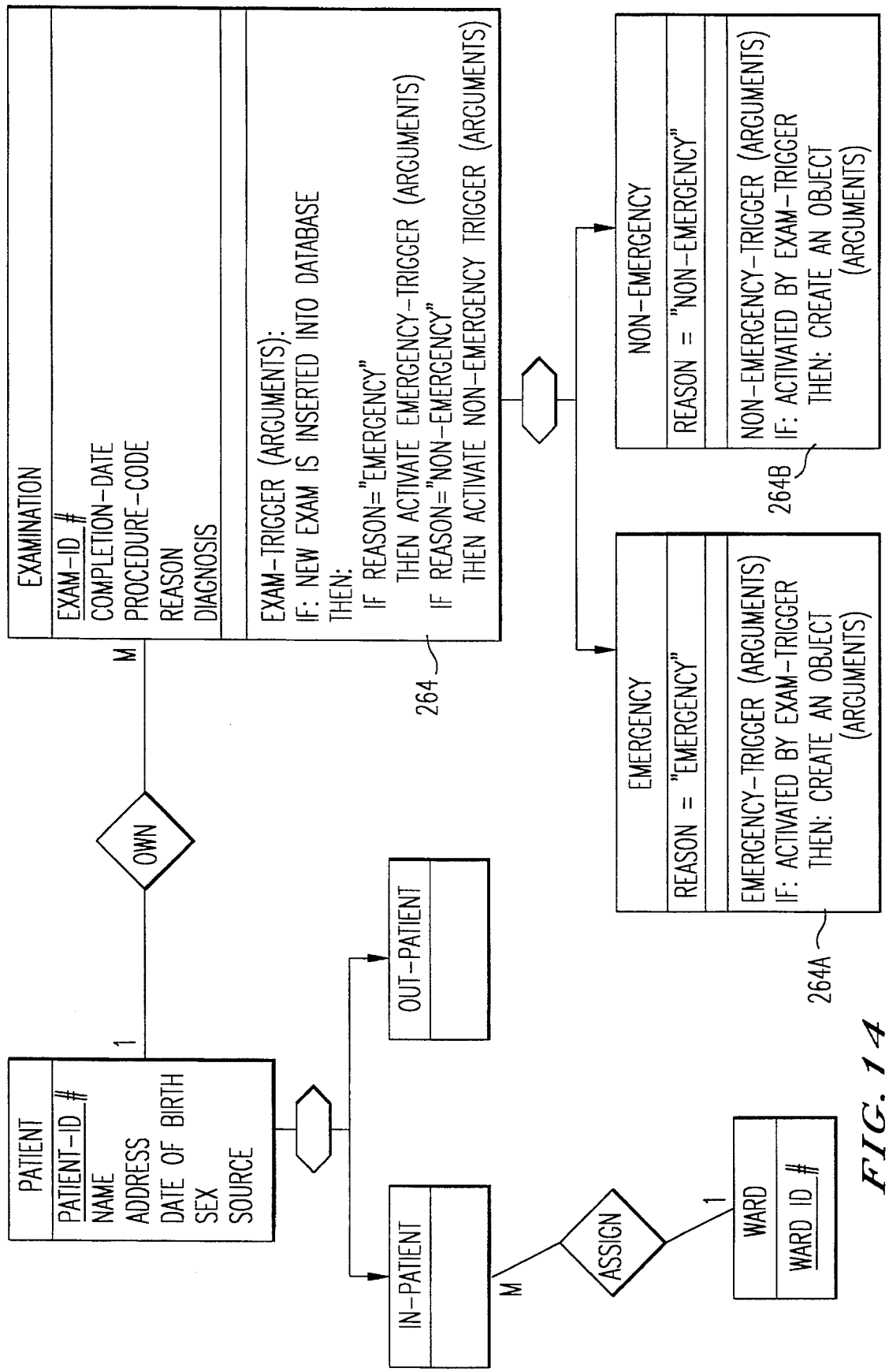
FIG. 14 is an illustration of a SOOER modeling construct for classes according to the present invention modeling control knowledge.

FIG. 14 illustrates an example of the control knowledge in the knowledge-based information retrieval system of the present invention. Based on the specialization relationship of the Examination superclass with the Emergency and Non-Emergency subclasses, a Trigger called Exam-Trigger 264 is defined which indicates its firing by documenting that a new examination is inserted in the database and, depending on the value of the Reason parameter, activates the Emergency-Trigger 264A or Non-Emergency-Trigger 264B of the Emergency or Non-Emergency subclasses, respectively.

With the modeling construct for the classes representing the structural, the heuristic, the general procedural, and the control knowledge defined, as shown in FIG. 5 and described above, and the constructs for the relationships between the classes defined, as shown in FIG. 8 and described above, the method for designing the coupled knowledge-base/database (KB/DB) system is carried out.

Figure 15:
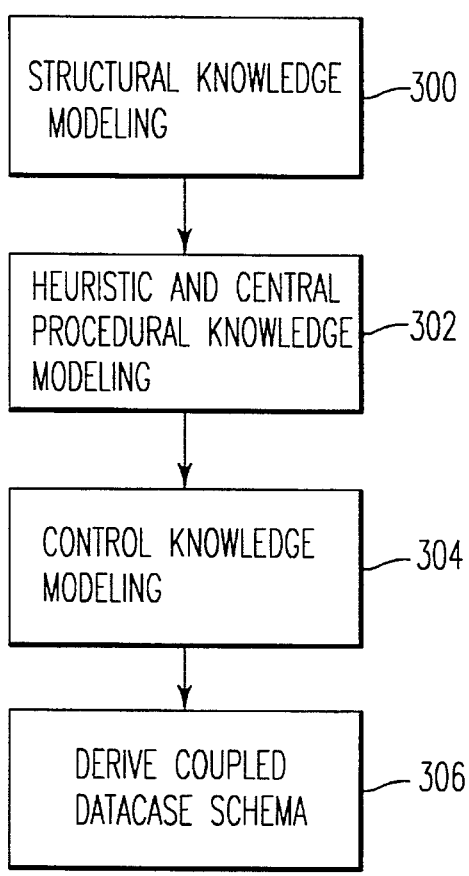
FIG. 15 is a flow diagram of the steps for designing a SOOER model for a coupled knowledge-base/database system according to the present invention.

In accordance with the SOOER method for designing a coupled KB/DB system, with reference to FIG. 15, the structural knowledge is modeled at step 300, the heuristic and general procedural knowledge are modeled at step 302, the control knowledge is modeled at step 304, and the relational schema for the coupled database is derived from the structural knowledge at step 306.

Figure 16:
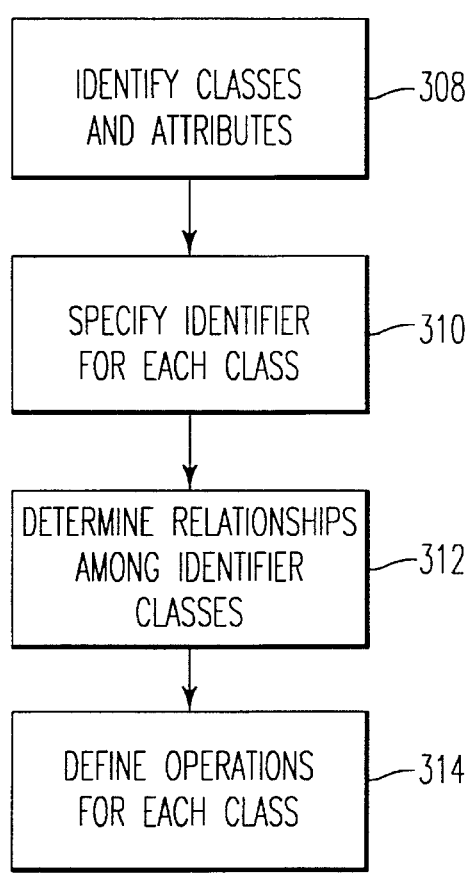
FIG. 16 is a flow diagram of the steps for modeling structural knowledge for designing a SOOER model for a coupled knowledge-base/database system according to the present invention.

With reference to FIG. 16, the steps for modeling structural knowledge according to the SOOER method are shown. The structural knowledge modeling identifies the data semantics of the application domain. At step 308, classes and their attributes are identified. Processes for identifying classes and their attributes are well-known and, in the method of the present invention, various well-known processes for performing this function could be used. As would be readily apparent to one of ordinary skill in the art, such processes for identifying classes and attributes include the processes set forth at pp. 52–78, 79–105, and 119–142 in Coad and Yourdon, "Object-Oriented Analysis," 2nd ed., Yourdon Press (1991), which are hereby incorporated by reference herein. The identifier of each class is specified at step 310. The relationships among the identifier classes is determined at step 312. Processes for specifying identifiers and determining the relationships among identifier classes are well-known and, in the method of the present invention, various well-known processes for performing this function could be used. As would be readily apparent to one of ordinary skill in the art, such processes for specifying identifiers and determining the relationships among identifier classes include the processes set forth at pp. 79–118 in Coad and Yourdon, "Object-Oriented Analysis," 2d ed., Yourdon Press (1991), which are hereby incoporated by reference herein. As previously discussed, in the SOOER model, there are three relationships among classes: association, specialization, and aggregation relationships. After the relationships are determined, at step 314, operations for each class are defined. Processes for defining operations are well-known and, in the method of the present invention, various well-known processes for performing this function could be used. As would be readily apparent to one of ordinary skill in the art, such process for defining operations include the processes set forth at pp. 143–172 in Coad and Yourdon, "Object-Oriented Analysis," 2d ed Yourdon Press (1991), which are hereby incorporated by reference herein.

Figure 17A:
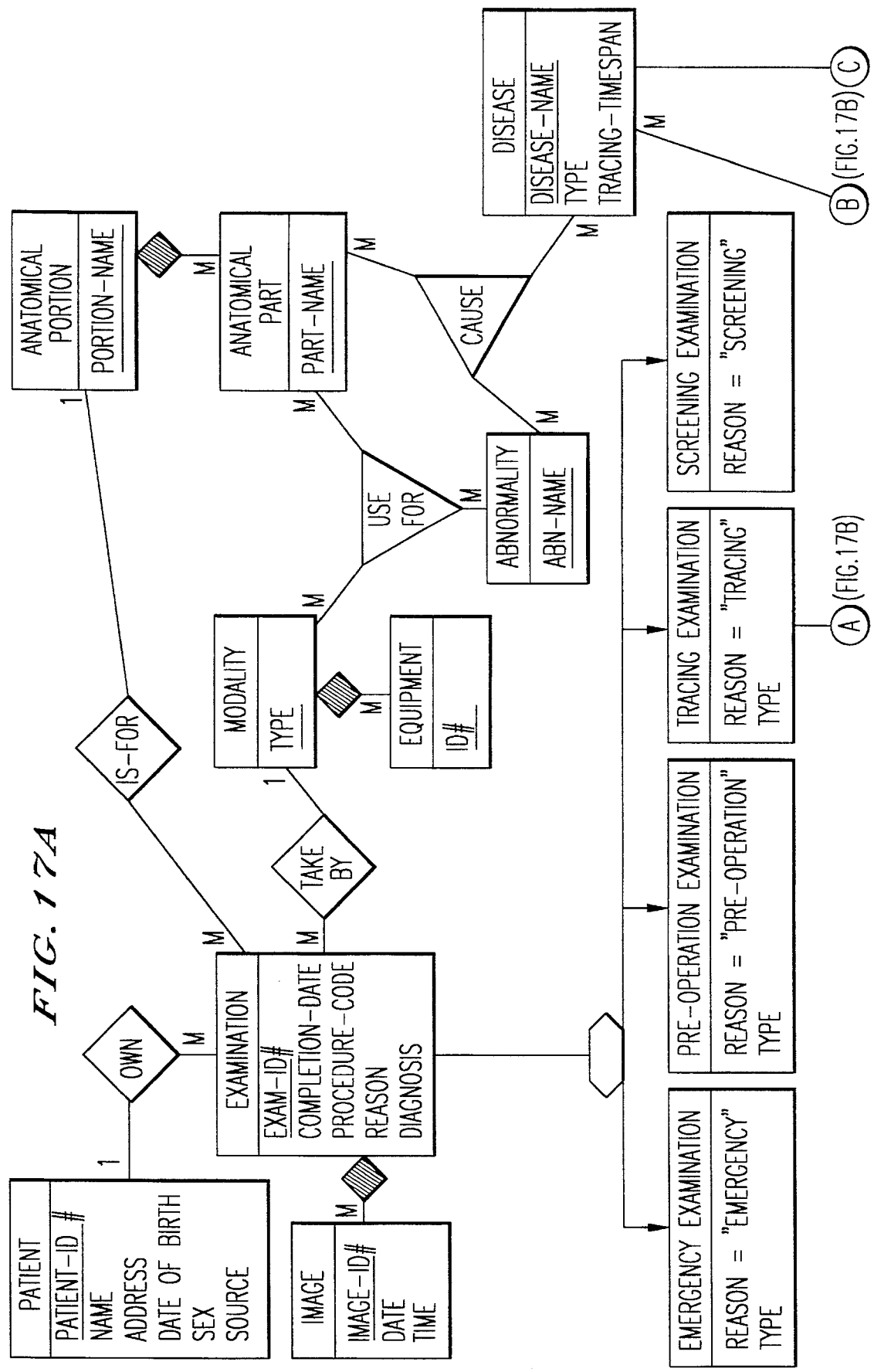
FIG. 17 is a SOOER diagram for a coupled knowledge-base/database system according to the present invention modeling structural knowledge.
Figure 17B:
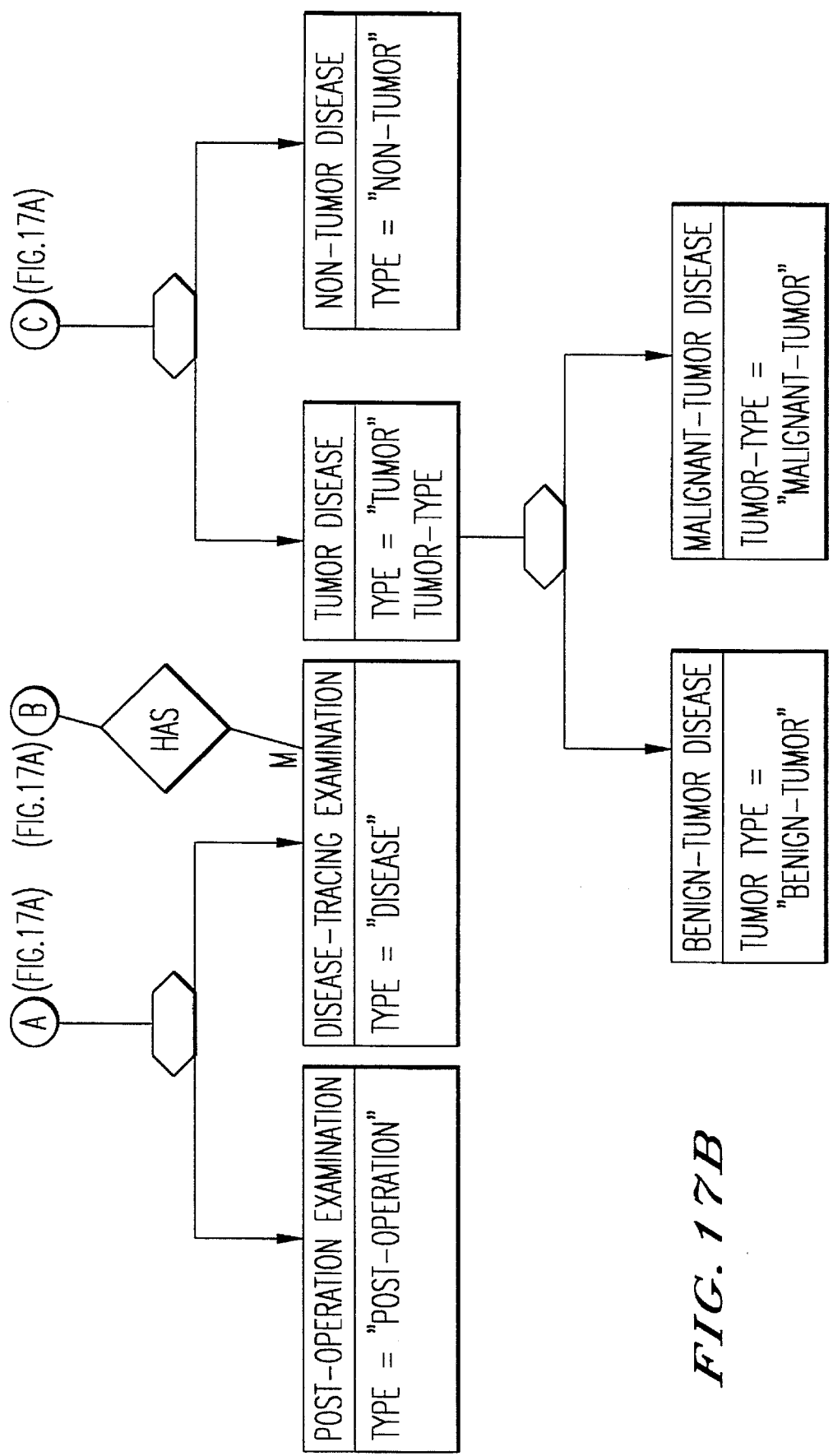

Applying the steps for modeling structural knowledge to the image retrieval system of the present invention, a SOOER diagram utilizing the SOOER modeling constructs described above is designed. FIG. 17 illustrates an example of the structural knowledge of the image retrieval system of the present invention modeled in a SOOER diagram.

Figure 18:
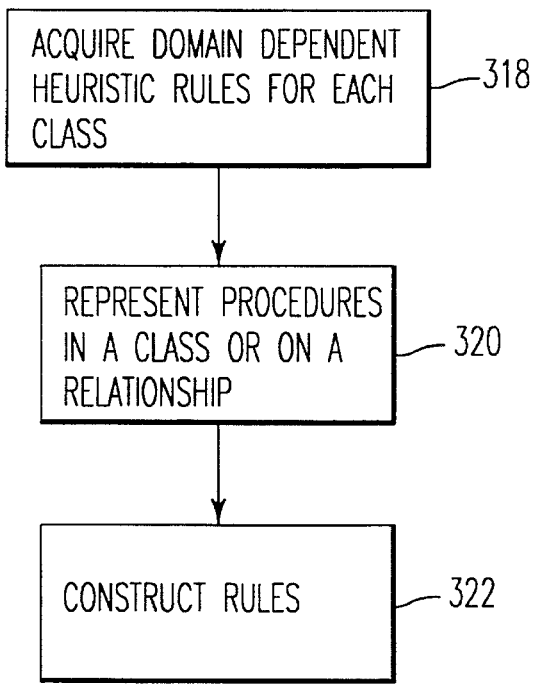
FIG. 18 is a flow diagram of the steps for modeling heuristic and general procedural knowledge for designing a SOOER model for a coupled knowledge-base/database system according to the present invention.

The steps for modeling the heuristic and general procedural knowledge are shown in FIG. 18. Modeling this knowledge provides the domain-dependent heuristic rules and the data processing procedures needed by the heuristic rules. In the first step in the modeling process, step 318, the domain heuristic rules for each class are acquired. These rules can be acquired by applying well-known knowledge acquisition techniques, such as knowledge elicitation and cognitive study. These well known techniques are set forth at pp. 111–151 in Ignizio, "Introduction to Expert Systems," McGraw-Hill, Inc. (1991), which are hereby incorporated herein by reference. Applying these techniques to acquire the rules in the method of the present invention would be readily apparent to one of ordinary skill in the art. Next, the data processing procedures required by the heuristic rules are specified at step 318. The data processing procedures can be identified by analyzing the acquired heuristic knowledge in accordance with the well-known knowledge acquisition techniques referred to above. At step 320, each procedure specified is represented in a class or on a relationship. The rules used in the classes are constructed at step 322, by utilizing the modeling constructs for procedures and class operations previously defined.

An example of the process for obtaining the domain expert knowledge in a radiological application, such as in the preferred embodiment of the present invention, is set forth in Sheng et al., "Design Of Knowledge-Based Image Retrieval System: Implications From Radiologists' Cognitive Process," SPIE Vol. 1654 Medical Imaging VI: PACS Design and Evaluation (1992) and Sheng et al., "Patient Image Retrieval: An Object-Oriented Coupled Knowledge-Based Database Approach," IEEE (1992), which are hereby incorporated herein by reference.

Figure 19A:
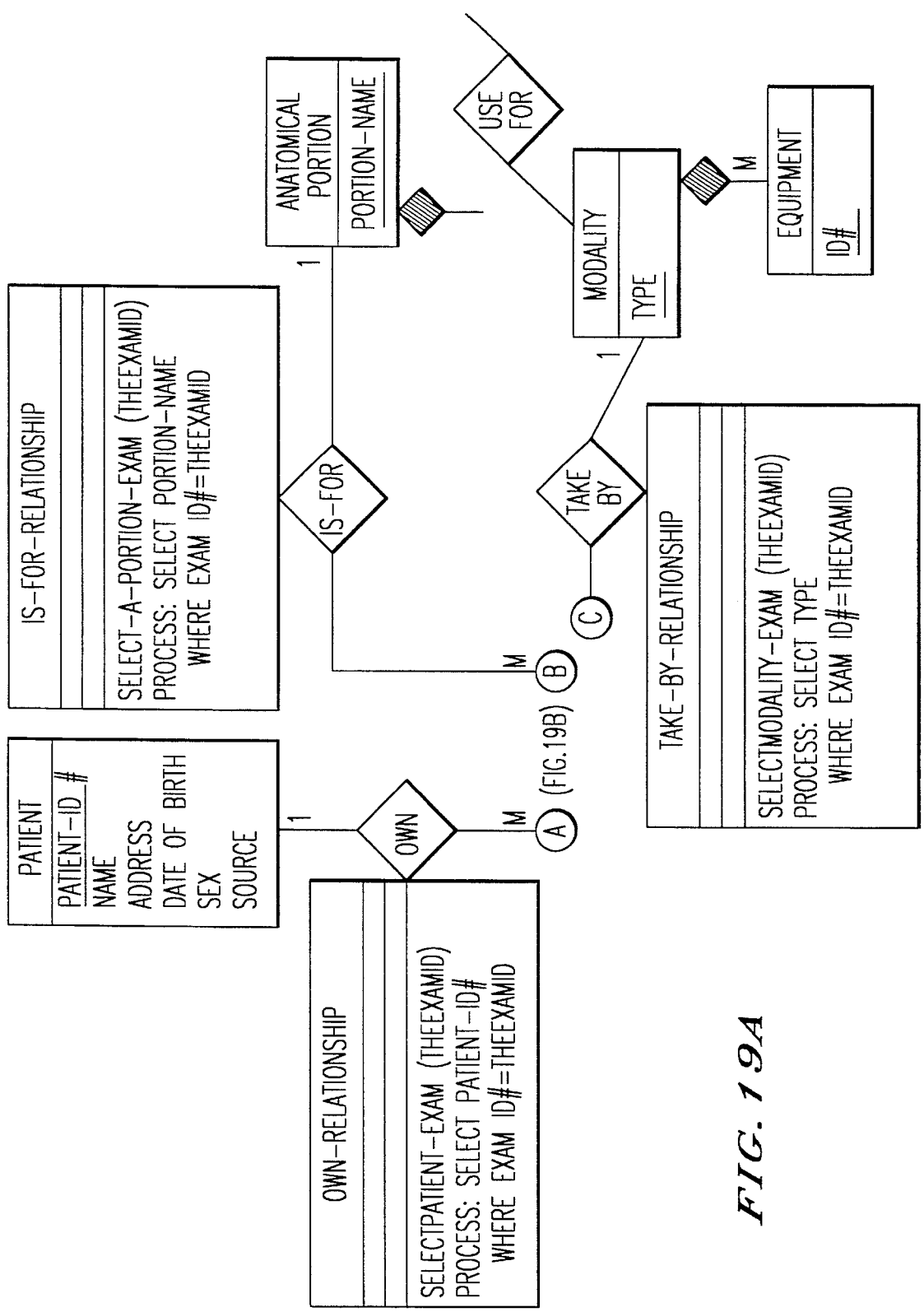
FIG. 19 is a SOOER diagram for a coupled knowledge-base/database system according to the present invention modeling heuristic, general procedural and control knowledge.
Figure 19B:
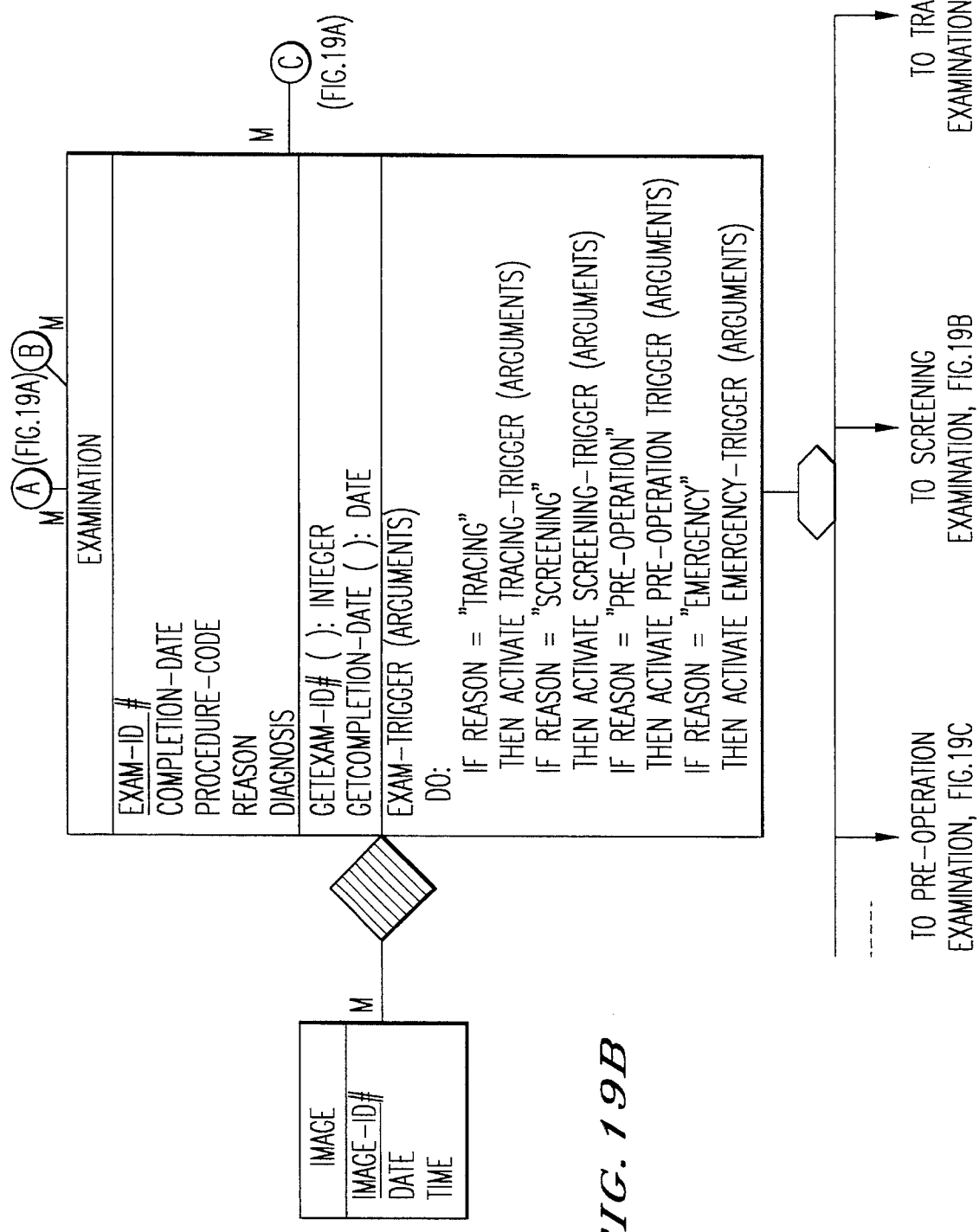
Figure 19C:
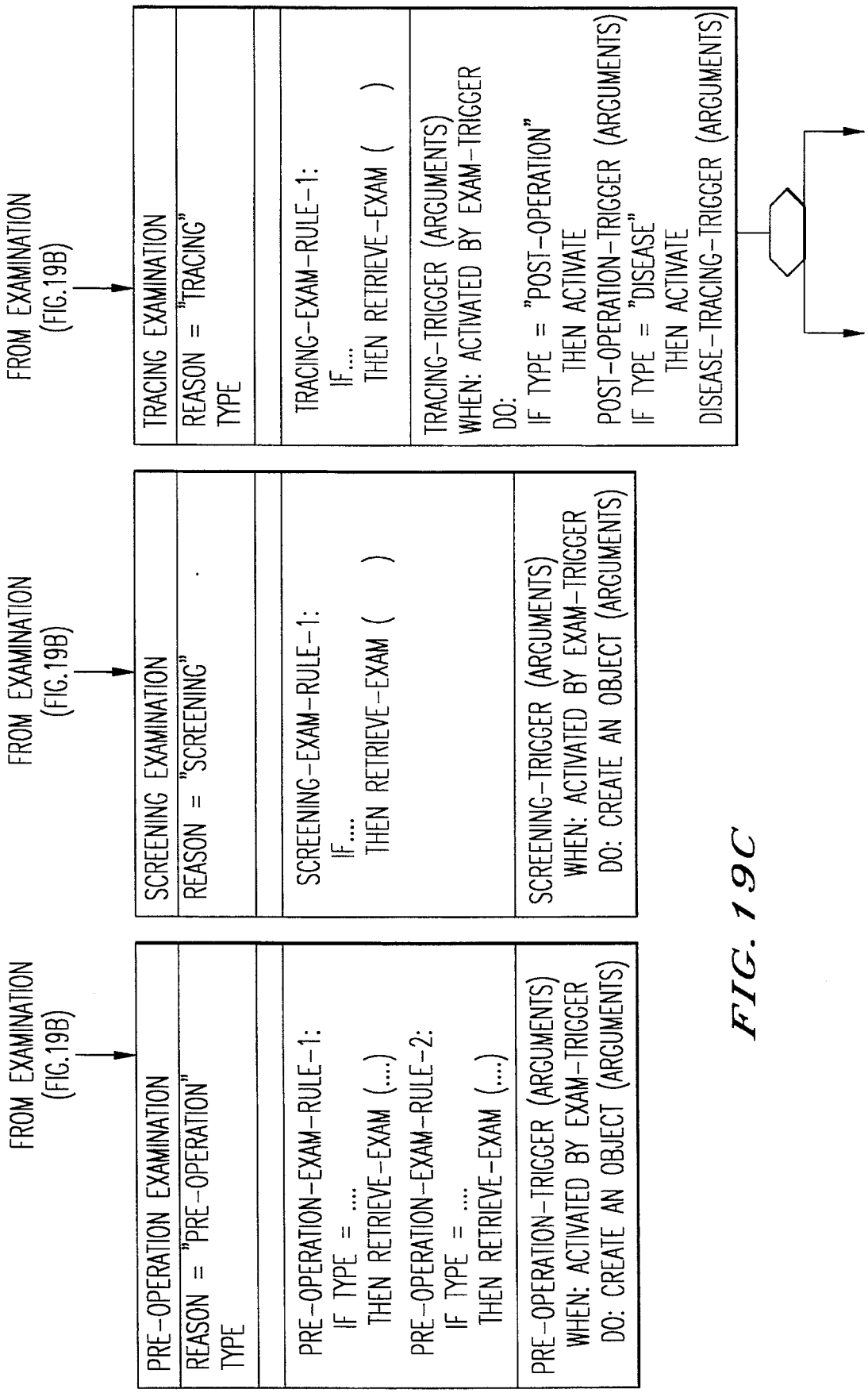

Applying the steps for modeling the heuristic and general procedural knowledge to the image retrieval system of the present invention, a SOOER diagram utilizing the SOOER modeling constructs described above is designed. FIG. 19 illustrates an example of the heuristic, general procedural, and control knowledge of the image retrieval system of the present invention modeled in a SOOER diagram.

Control knowledge modeling defines the process of heuristic knowledge reasoning. Referring to FIG. 20, searching paths are specified for defining which classes are searched and the order of search during the reasoning process (knowledge processing.) At step 324, the intra-class-hierarchy searching paths are specified. The inter-class-hierarchy searching paths are specified in step 326. The searching paths can be specified by applying well-known knowledge acquisition techniques, such as knowledge elicitation and cognitive study. These well-known techniques are set forth at pp. 111–151 in Ignizio, "Introduction to Expert Systems," McGraw-Hill, Inc. (1991), which are hereby incorporated herein by reference. Applying these techniques to specify the searching paths in the method of the present invention would be readily apparent to one of ordinary skill in the art. The searching paths specified in steps 324 and 326 are represented in the SOOER KB, at step 328, as triggers, which are defined for classes for each class hierarchy.

Applying the steps for modeling control knowledge to the image retrieval system of the present invention, a SOOER diagram utilizing the SOOER modeling constructs described above is designed. FIG. 19 illustrates an example of the knowledge-base design including the structural, heuristic, general procedural, and control knowledge of the image retrieval system of the present invention modeled in a SOOER diagram.

The relational schema for the coupled database can be derived from the SOOER diagram for the knowledge-base. The relational database schema can be derived from the structural knowledge. The transformation rules for deriving the relational database schema from the structural knowledge are well-known. Such well-known transformation rules are set forth at pp. 366–396 in Rumbaugh et al , "Object-Oriented Modeling and Design," Prentice Hall (1991) and in Teorey, "Database Modeling and Design: The Entity-Relationship Approach," Morgan Kaufmann Publishers (1990), which are incorporated herein by reference. Applying these rules for deriving the database schema in the method of the present invention would be readily apparent to one of ordinary skill in the art.

Applying the steps for deriving the relational schema for the coupled database to the SOOER diagram for the knowledge-base of the image retrieval system of the present invention, the coupled database schema is derived. FIG. 21 illustrates an example of the coupled database schema for the image retrieval system of the present invention.

Referring now to FIGS. 22–25, the procedure for performing knowledge processing is shown. In a coupled knowledge-base/database system designed according to the SOOER method described above, the reasoning process is accomplished by searching the SOOER knowledge-base. Searching in a SOOER knowledge-base is performed by intra- and inter-class hierarchy trigger-to-trigger communications.

Searching in a SOOER class diagram, which is a diagram containing all the relationships as, for example, shown in FIG. 19 described above, includes searching within class hierarchies and from one class hierarchy to another. Searching in one class hierarchy is enabled by the trigger of a superclass that determines an appropriate subclass through the specialization relationship and activates the appropriate subclasses's trigger. As a result, the heuristic knowledge of a more specialized class can be accessed.

Searching from one class hierarchy to another is allowed only if an association or aggregation relationship between the two class hierarchies exists. To perform this type of searching, a trigger in one class hierarchy will activate a trigger in another class hierarchy.

During the searching process, objects are dynamically created by triggers. With this functionality, triggers can be treated as a dynamic object creation mechanism. By means of dynamic object creation, heuristic knowledge of the related/required objects will be derived and then be applied.

Figure 24:
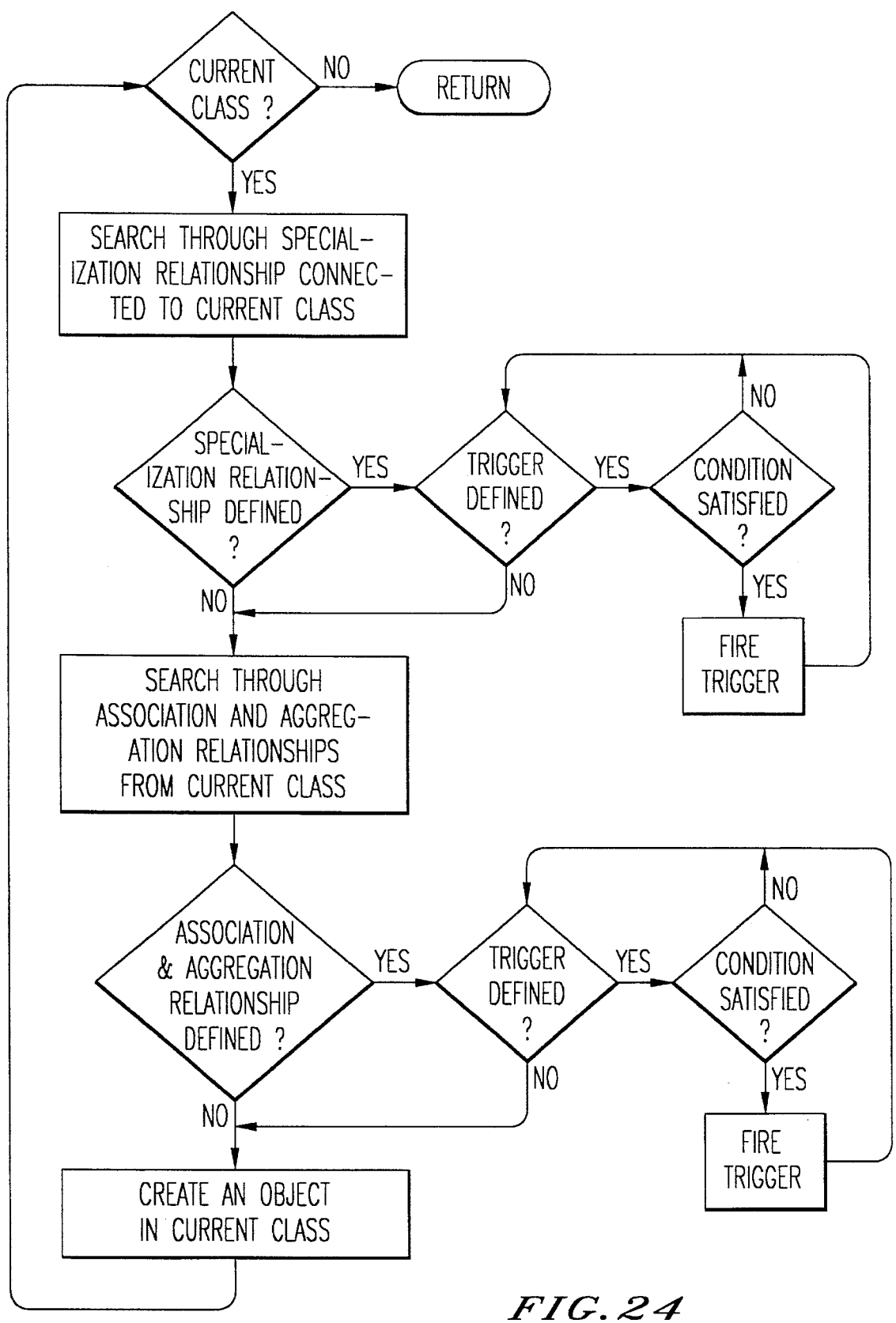
FIG. 24 is a flow diagram of the process for class searching in a knowledge-based system according to the present invention.
Figure 25:
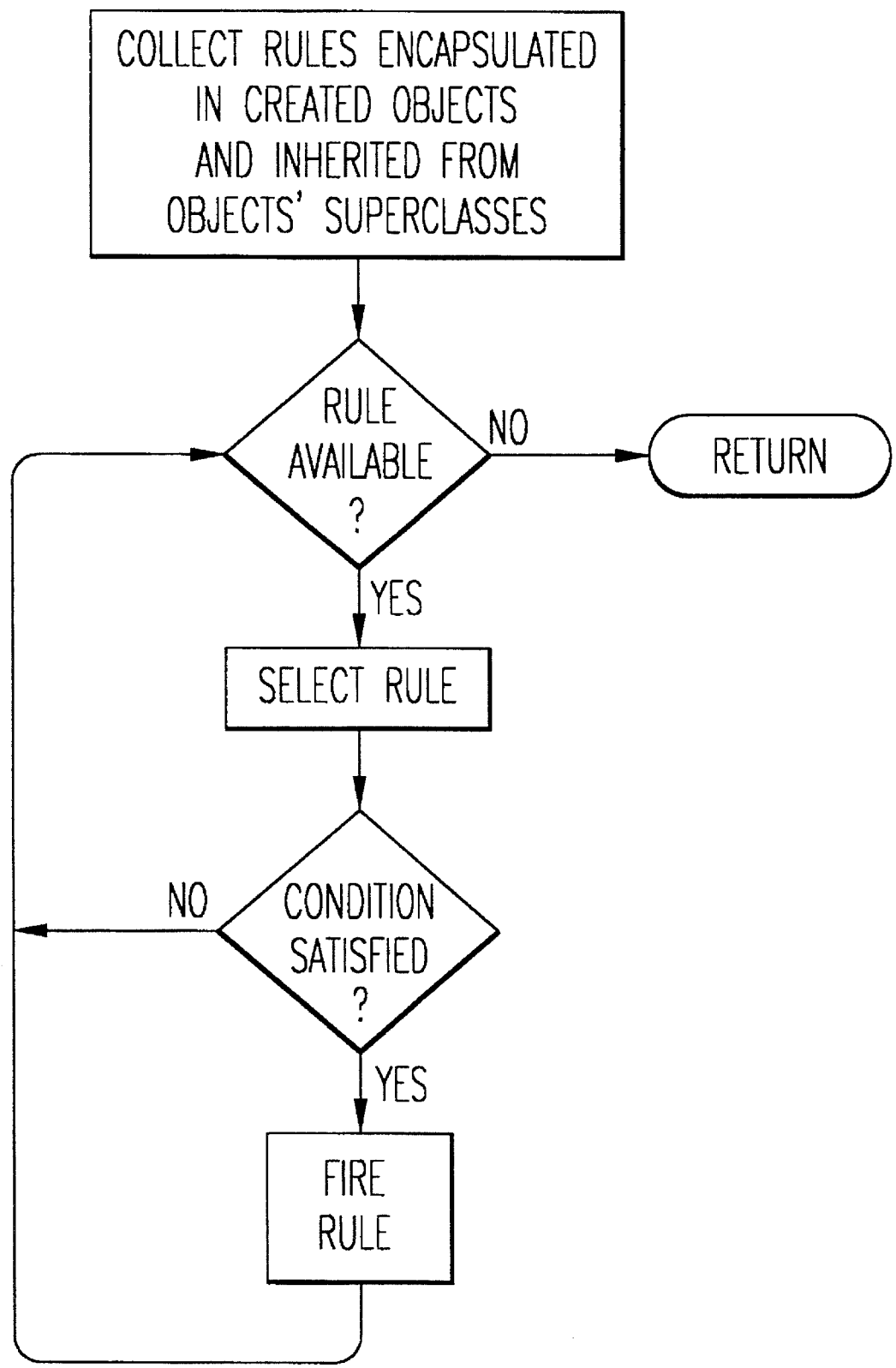
FIG. 25 is a flow diagram of the knowledge processing procedure in a knowledge-based system according to the present invention.

Referring to FIGS. 22–25, flow diagrams of the general operation of a knowledge-based system according to the present invention are provided. FIG. 22 is a flow diagram of the operation of a knowledge-based system according to the present invention. FIG. 23 is a flow diagram of the reasoning process of a knowledge-based system according to the present invention. FIG. 24 is a flow diagram of the process for class searching in a knowledge-based system according to the present invention. FIG. 25 is a flow diagram of the knowledge processing procedure in a knowledge-based system according to the present invention.

Obviously, numerous (additional) modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A knowledge-based system for the retrieval of images based on expert knowledge and patient information stored in a computer system, the knowledge-based system comprising:

a first memory means for storing a knowledge-base comprising the expert knowledge information including structural knowledge on a plurality of classes, general procedural knowledge, heuristic knowledge stored in the form of rules, and control knowledge for controlling the functions of searching hierarchies of the plurality of classes and dynamically creating objects;

a second memory means for storing a database comprising the patient information including patient data, examination data and images;

knowledge-base/database interface means for coupling said database to said knowledge-base for receiving and transmitting information therebetween;

means for storing new patient information in the second memory means;

reasoning means for searching the hierarchies of the plurality of classes stored in the knowledge-base, for dynamically creating objects and for selecting rules in response to storing the new patient information in the second memory means, said searching and selecting being conducted based on said stored control knowledge, structural knowledge and general procedural knowledge, and said stored patient information;

retrieving means to search the patient information stored in the database and to retrieve the examination data indicated by the execution of the rules selected by said reasoning means;

user interface means for accessing said stored patient information from said database and outputting the patient information retrieved by said retrieving means; and control interface means for coupling said user interface means to said knowledge-base for receiving and transmitting information and controlling the flow of information therebetween.

2. A knowledge-based system according to claim 1, wherein said structural knowledge includes attribute information, identifier information, and relationship information on said plurality of classes.

3. A knowledge-based system according to claim 2, wherein the relationships among said classes represented in said relationship information are association relationships, specialization relationships, and aggregation relationships.

4. A knowledge-based system according to claim 2, wherein said general procedural knowledge includes information on a plurality of data processing procedures performed on said classes.

5. A knowledge-based system according to claim 4, wherein said data processing procedures includes query and update operations for performing on said classes and said relationships among said classes.

6. A knowledge-based system according to claim 1, wherein said heuristic knowledge includes information on reasoning processes for determining the images to be retrieved.

7. A knowledge-based system according to claim 6, wherein said information on reasoning processes is stored in the form of a plurality of rules.

8. A knowledge-based system according to claim 7, wherein said stored rules are in an "IF-THEN" format.

9. A knowledge-based system according to claim 8, wherein each rule selected by said reasoning means is executed by said retrieving means upon satisfaction of the "IF" condition of said rule.

10. A knowledge-based system according to claim 1, wherein said control knowledge comprises rules represented as triggers owned by at least one respective of the plurality of classes.

11. A knowledge-based system according to claim 1, wherein said user interface means includes means for displaying the images retrieved.

12. A knowledge-based system which includes a coupled knowledge-base and database stored in a computer system for operating in a predetermined application domain, the knowledge-based system comprising:

a first memory for storing a knowledge-base comprising data representative of application domain expert knowledge including structural knowledge on a plurality of classes, general procedural knowledge, heuristic knowledge stored in the form of rules, and control knowledge for controlling the functions of searching hierarchies of the plurality of classes and dynamically creating objects;

a second memory for storing a database comprising data which are a plurality of instances of said structural knowledge;

knowledge-base/database interface means for coupling said database to said knowledge-base for receiving and transmitting data therebetween;

means for storing new instances of said structural knowledge in said second memory means;

reasoning means for searching the hierarchies of the plurality of classes stored in the knowledge-base, for dynamically creating objects and for selecting rules in response to storing the new instances of said structural knowledge in said second memory means, said searching and selecting being conducted based on said stored control knowledge, structural knowledge and general procedural knowledge, and the data stored in said database;

retrieving means to search the data stored in the database and to retrieve the data indicated by the execution of the rules selected by said reasoning means;

user interface means for accessing the data stored in said database and outputting the data retrieved by said retrieving means; and control interface means for coupling said user interface means to said knowledge-base for receiving and transmitting data and controlling the flow of data therebetween.

13. A knowledge-based system according to claim 12, wherein said structural knowledge includes attribute information, identifier information, and relationship information on said plurality of classes.

14. A knowledge-based system according to claim 13, wherein the relationships among said classes represented in said relationship information are association relationships, specialization relationships, and aggregation relationships.

15. A knowledge-based system according to claim 14, wherein said general procedural knowledge includes information on a plurality of data processing procedures performed on said classes.

16. A knowledge-based system according to claim 15, wherein said data processing procedures includes query and update operations for performing on said classes and said relationships among said classes.

17. A knowledge-based system according to claim 12, wherein said heuristic knowledge includes information on reasoning processes for determining the data to be retrieved.

18. A knowledge-based system according to claim 17, wherein said information on reasoning processes is stored in the form of a plurality of rules.

19. A knowledge-based system according to claim 18, wherein said stored rules are in an "IF-THEN" format.

20. A knowledge-based system according to claim 19, wherein each rule selected by said reasoning means is executed by said retrieving means upon satisfaction of the "IF" condition of said rule.

21. A knowledge-based system according to claim 12, wherein said control knowledge comprises rules represented as triggers owned by at least one respective of the plurality of classes.

22. A knowledge-based system according to claim 21, wherein said user interface means includes means for displaying the data retrieved.

23. A method for retrieving images based on expert knowledge and patient information stored in a computer system, the method comprising the steps of:

storing in a knowledge-base the expert knowledge information including structural knowledge on a plurality of classes, general procedural knowledge, heuristic knowledge stored in the form of a plurality of rules in an "IF-THEN" format, and control knowledge for controlling the functions of searching hierarchies of the plurality of classes and dynamically creating objects;

storing in a database patient information including patient data, examination data and images;

receiving and transmitting information between the knowledge-base and database;

storing new patient information in the database;

searching the hierarchies of the plurality of classes stored in the knowledge base, creating objects dynamically and selecting rules in response to storing the new patient information in the database, said searching and selecting being conducted based on said stored control knowledge, structural knowledge and general procedural knowledge, and said stored patient information;

executing each rule selected from searching the plurality of classes upon satisfaction of the "IF" condition of said rule;

searching the patient information stored in the database and retrieving the patient information indicated by the rules executed; and outputting the patient information retrieved.

24. A method for retrieving images according to claim 23, wherein the step of storing structural knowledge in the knowledge-base includes storing attribute information, identifier information, and relationship information on said plurality of classes.

25. A method for retrieving images according to claim 24, wherein the relationships among said classes represented in said stored relationship information are association relationships, specialization relationships, and aggregation relationships.

26. A method for retrieving images according to claim 23, wherein the step of storing the general procedural knowledge in the knowledge-base includes storing information on a plurality of data processing procedures performed on said classes.

27. A method for retrieving images according to claim 23, wherein the step of storing the heuristic knowledge in the knowledge-base includes storing information on reasoning processes for determining the images to be retrieved.

28. A method for retrieving images according to claim 27, wherein the step of storing the control knowledge in the knowledge-base includes storing the control knowledge in the form of rules represented as triggers owned by at least one respective of the plurality of classes.

29. A knowledge-based system which includes a coupled knowledge-base and database for operating in a predetermined application domain, the knowledge-based system comprising:

a memory for storing data representative of domain expert knowledge including structural knowledge on attributes and identifiers of a plurality of classes and relationships between the classes, general procedural knowledge on a plurality of data processing procedures performed on the classes, heuristic knowledge on reasoning processes for performing predetermined functions in the application domain, and domain dependent control knowledge for determining the reasoning process specific to the application domain by controlling the functions of searching hierarchies of the plurality of classes and dynamically creating objects; and control means coupled to said memory for controlling the storage of new data in said memory by searching the hierarchies of the plurality of classes and dynamically creating objects in response to storing the new data in said memory.

30. A knowledge-based system according to claim 29, wherein the structural knowledge stored in said memory includes attribute information, identifier information, and relationship information on said plurality of classes, said attribute information, identifier information, and relationship information on each class being represented in the form Attribute-name: data-type=default-value Identifier: Attribute-names Operation-name (arguments): return-type.

31. A knowledge-based system according to claim 30, wherein the relationships among said classes represented in said relationship information are association relationships, specialization relationships, and aggregation relationships.

32. A knowledge-based system according to claim 31, wherein the general procedural knowledge stored in said memory includes information on a plurality of data processing procedures performed on said classes, said data processing procedures performed on each class being represented in the form Procedure-name (arguments):
   SELECT output-specification
   WHERE constraint-specification.

33. A knowledge-based system according to claim 32, wherein said data processing procedures includes query and update operations for performing on said classes and said relationships among said classes.

34. A knowledge-based system according to claim 33, wherein the heuristic knowledge stored in said memory includes information on reasoning processes for performing predetermined functions in the application domain, said information on reasoning processes being stored in the form of a plurality of rules encapsulated in said plurality of classes, each rule encapsulated in each class being represented in the form Rule-name:
   IF condition-specification
   THEN action-specification.

35. A knowledge-based system according to claim 34, wherein the domain dependent control knowledge stored in said memory comprises rules represented in the form Trigger-name (arguments):

IF: activated-condition-specification

THEN: action-specification owned by at least one respective of the plurality of classes.

* * * * *